US012255383B2

(12) United States Patent
Seo et al.

(10) Patent No.: US 12,255,383 B2
(45) Date of Patent: Mar. 18, 2025

(54) ANTENNA MODULE AND ELECTRONIC DEVICE INCLUDING THE SAME

(71) Applicant: Samsung Electronics Co., Ltd., Suwon-si (KR)

(72) Inventors: Mincheol Seo, Suwon-si (KR); Donghun Shin, Suwon-si (KR); Minkyung Lee, Suwon-si (KR); Jiho Kim, Suwon-si (KR); Sunghyup Lee, Suwon-si (KR); Kyihyun Jang, Suwon-si (KR); Huiwon Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/624,631

(22) Filed: Apr. 2, 2024

(65) Prior Publication Data

US 2024/0283136 A1 Aug. 22, 2024

Related U.S. Application Data

(63) Continuation of application No. 17/568,128, filed on Jan. 4, 2022, now Pat. No. 11,955,699, which is a (Continued)

(30) Foreign Application Priority Data

Jan. 4, 2021 (KR) ........................ 10-2021-0000462

(51) Int. Cl.
*H01Q 1/24* (2006.01)
*H01Q 9/04* (2006.01)

(52) U.S. Cl.
CPC ........... *H01Q 1/243* (2013.01); *H01Q 9/0407* (2013.01)

(58) Field of Classification Search
CPC ............................ H01Q 1/243; H01Q 9/0407
(Continued)

(56) References Cited

U.S. PATENT DOCUMENTS 8,750,949 B2 * 6/2014 Merz .................. H04B 1/38
343/702
10,306,029 B1 * 5/2019 Hwang .............. H04M 1/0202
(Continued)

FOREIGN PATENT DOCUMENTS

CN 111725608 A 9/2020
CN 112003013 A 11/2020
(Continued)

OTHER PUBLICATIONS

European search report dated Apr. 8, 2024, issued in European Application No. 21915617.1.
(Continued)

*Primary Examiner* — April G Gonzales
(74) *Attorney, Agent, or Firm* — Jefferson IP Law, LLP

(57) ABSTRACT

An electronic device is provided. The electronic device includes a housing including a side member, a support member, a display, an antenna module including one or more patch antennas, a printed circuit board (PCB), a wireless communication circuit disposed on the PCB, a first conductive member, a first connector, a second connector, and a protrusion extending from the first end of the first conductive member toward an interior of the housing, and electrically connected to the first conductive member. The antenna module is disposed at locations corresponding to a first opening defined by the first conductive member, the support member, the first connector, and the second connector, and a second opening defined by the first conductive member, the support member, the first connector, and the protrusion, (Continued)

and the wireless communication circuit is electrically connected to the protrusion and the antenna module.

20 Claims, 14 Drawing Sheets

Related U.S. Application Data continuation of application No. PCT/KR2021/019038, filed on Dec. 15, 2021.

(58) Field of Classification Search
USPC .................................................... 455/575.7
See application file for complete search history.

(56) References Cited

U.S. PATENT DOCUMENTS

| | | | | |
|---|---|---|---|---|
| 10,516,204 | B2* | 12/2019 | Cho | H01Q 21/061 |
| 10,560,557 | B2* | 2/2020 | Hwang | H01Q 1/243 |
| 10,720,951 | B2* | 7/2020 | Song | H01Q 13/10 |
| 10,887,434 | B2* | 1/2021 | Hwang | H01Q 13/10 |
| 11,258,163 | B2* | 2/2022 | Froese | H01Q 21/28 |
| 11,303,014 | B2* | 4/2022 | Lim | H01Q 1/02 |
| 2010/0231481 | A1* | 9/2010 | Chiang | H01Q 9/42 |
| | | | | 343/702 |
| 2010/0321253 | A1* | 12/2010 | Ayala Vazquez | H01Q 13/18 |
| | | | | 343/702 |
| 2012/0223865 | A1* | 9/2012 | Li | H01Q 1/243 |
| | | | | 343/702 |
| 2013/0214986 | A1* | 8/2013 | Zhu | H01Q 1/243 |
| | | | | 343/866 |
| 2015/0005037 | A1* | 1/2015 | Caballero | H04M 1/026 |
| | | | | 455/566 |
| 2019/0165454 | A1* | 5/2019 | Lee | H01Q 1/245 |
| 2021/0075091 | A1* | 3/2021 | Lee | H01Q 21/067 |
| 2022/0006176 | A1* | 1/2022 | Froese | H05K 5/0004 |
| 2022/0069443 | A1* | 3/2022 | Jeon | H04M 1/0249 |
| 2023/0387584 | A1* | 11/2023 | Ravichandran | H01Q 1/48 |
| 2023/0420829 | A1* | 12/2023 | Lee | H01Q 9/0407 |

FOREIGN PATENT DOCUMENTS

| | | |
|---|---|---|
| KR | 10-2018-0097237 A | 8/2018 |
| KR | 10-2019-0028184 A | 3/2019 |
| KR | 10-2020-0026000 A | 3/2020 |
| KR | 10-2020-0073745 A | 6/2020 |
| KR | 10-2020-0092719 A | 8/2020 |
| KR | 10-2021-0079998 A | 6/2021 |

OTHER PUBLICATIONS

International Search Report issued on Mar. 29, 2022, issued in International Application No. PCT/KR2021/019038.

* cited by examiner

ANTENNA MODULE AND ELECTRONIC DEVICE INCLUDING THE SAME

CROSS-REFERENCE TO RELATED APPLICATION(S)

This application is a continuation application of prior application Ser. No. 17/568,128 filed on Jan. 4, 2022, which has issued as U.S. Pat. No. 11,955,699 on Apr. 9, 2024; which is a continuation application, claiming priority under § 365(c), of an International application No. PCT/KR2021/019038 filed on Dec. 15, 2021; and which is based on and claims the benefit of a Korean patent application number 10-2021-0000462 filed on Jan. 4, 2021 in the Korean Intellectual Property Office, the disclosure of each of which is incorporated by reference herein in its entirety.

TECHNICAL FIELD

The disclosure relates to an antenna module and an electronic device including the same.

BACKGROUND ART

Due to development of mobile communication technologies, electronic devices including at least one antenna have been widely distributed. The electronic device may transmit and/or receive a radio frequency (RF) signal including a voice signal or data (e.g., a message, a picture, a video, a music file, or a game) by using an antenna.

An antenna of the electronic device may transmit and/or receive signals pertaining to different frequency bands by using the plurality of frequency bands. The electronic device may service a global communication band by using signals pertaining to different frequency bands. For example, the electronic device may perform communication (e.g., a global positioning system (GPS), Legacy, wireless fidelity (Wifi)1) that uses signals pertaining to a low frequency band (LB), and/or communication (e.g., Wifi2) that uses signals pertaining to a high frequency band (HB).

The electronic device may transmit and/or receive signals by using a housing itself including a conductive material, as well as an antenna module disposed in an interior of the housing, as a radiator. For example, at least a portion of the metal housing included in the electronic device may be electrically connected to a power supply unit, and the power supply unit may transmit and/or receive signals pertaining to various frequency bands through at least a portion of the metal housing. The electronic device may include a structure having an opening filled with a nonconductive material in one area of an interior of the housing to efficiently transmit and/or receive a frequency signal.

The above information is presented as background information only to assist with an understanding of the disclosure. No determination has been made, and no assertion is made, as to whether any of the above might be applicable as prior art with regard to the disclosure.

DISCLOSURE

Technical Problem

In the electronic device, various constituent elements (e.g., a camera module) may be disposed in the interior of the housing. Then, as the number of constituent elements that are to be disposed increases, an interior disposition space may become narrower.

For example, as the disposition space becomes narrower, an interference phenomenon may occur between a plurality of antenna radiators that transmit and/or receive signals of different frequency areas. Furthermore, when an operation of an antenna is performed by additionally using a portion of the housing, an aesthetic aspect of the electronic device may be degraded.

Aspects of the disclosure are to address at least the above-mentioned problems and/or disadvantages and to provide at least the advantages described below. Accordingly, an aspect of the disclosure is to provide an electronic device that uses at least a portion of a physical structure that defines an external appearance of the electronic device to radiate electromagnetic signals.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a housing including a first plate facing a first direction, a second plate facing a second direction that is opposite to the first direction, and a side member surrounding a space between the first plate and the second plate and connecting one side of the first plate and one side of the second plate, a support member disposed in the space between the first plate and the second plate, a display disposed on a first surface of the support member and exposed through at least a portion of the first plate, an antenna module disposed on a second surface facing a direction that is opposite to the first surface of the support member and including one or more patch antennas, a printed circuit board (PCB) disposed on the second surface of the support member, a wireless communication circuit disposed on the PCB, a first conductive member included in the side member, and extending from a first end to a second end toward a third direction, a first connector protruding from one point between the first end and the second end of the first conductive member toward an interior of the housing, and physically connected to the support member, a second connector extending from the second end of the first conductive member toward an interior of the housing, and physically connected to the support member, and a protrusion extending from the first end of the first conductive member toward an interior of the housing, and electrically connected to the first conductive member. For example, the antenna module may be disposed at locations corresponding to a first opening defined by the first conductive member, the support member, the first connector, and the second connector, and a second opening defined by the first conductive member, the support member, the first connector, and the protrusion, and the wireless communication circuit may be electrically connected to the protrusion and the antenna module.

In accordance with another aspect of the disclosure, an electronic device is provided. The electronic device includes a housing including a first plate facing a first direction, a second plate facing a second direction that is opposite to the first direction, and a side member surrounding a space between the first plate and the second plate and connecting one side of the first plate and one side of the second plate, a support member disposed in the space between the first plate and the second plate, a display disposed on a first surface of the support member and exposed through at least a portion of the first plate, an antenna module disposed on a second surface facing a direction that is opposite to the first surface of the support member and including one or more patch antennas, a PCB disposed on the second surface of the support member, a wireless communication circuit disposed on the PCB, a first conductive member included in the side member, and extending from a first end to a second end toward a third direction, a second conductive member included in the side member, and physically spaced apart from the first conductive member by a first division part, a first connector protruding from one point between the first end and the second end of the first conductive member toward an interior of the housing, and physically connected to the support member, a second connector protruding from the second end of the first conductive member toward an interior of the housing, and physically connected to the support member, and a protrusion protruding from one point spaced apart from a first end of the second conductive member, which is adjacent to the first division part, by a distance in a fourth direction that is a direction that is opposite to the third direction, toward an interior of the housing, and electrically connected to the second conductive member. For example, the antenna module may be disposed at a location corresponding to at least one of a first opening defined by the first conductive member, the support member, the first connector and the second connector, or a second opening defined by the first conductive member, the second conductive member, the first connector, the support member and the protrusion, and the wireless communication circuit may be electrically connected to the protrusion and the antenna module.

The electronic device according to the embodiment disclosed in the disclosure may overcome a spatial restriction by transmitting and/or receiving frequency signals of various bands by using at least a portion of a physical structure that defines an external appearance of the electronic device.

Advantageous Effects

According to various embodiments disclosed in the disclosure, it may be possible to overcome a restriction on a disposition space in a housing of an electronic device by utilizing a physical structure of a partial area of the housing as an antenna radiator.

In addition, the electronic device may have a housing structure that is implemented together with an antenna module that transmits and/or receives a signal of a specific frequency band to allow signals of a plurality of bands including the specific band to be efficiently transmitted and/or received.

Besides, a variety of effects directly or indirectly understood through the specification may be provided.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numerals are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
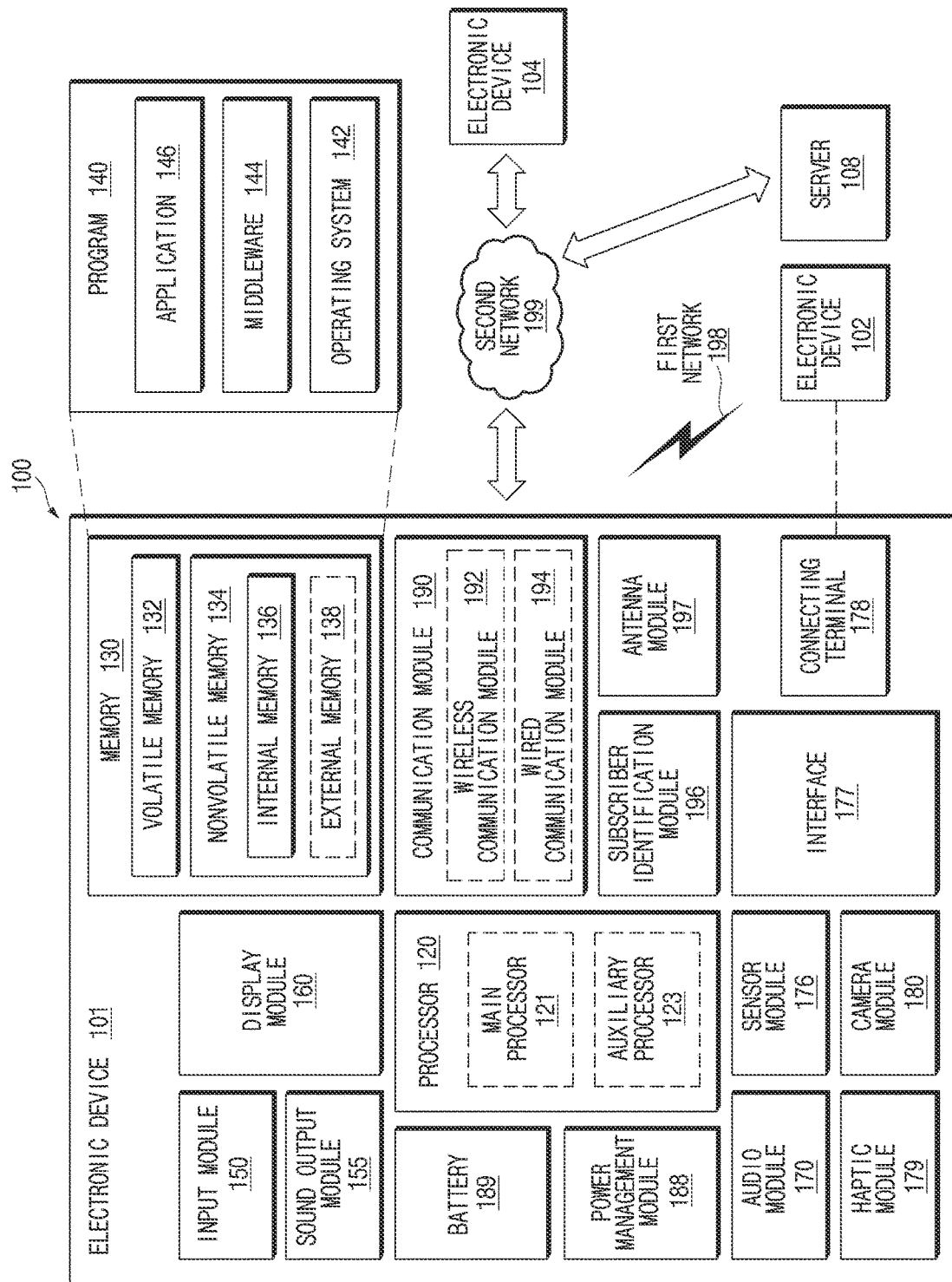
FIG. 1 is a diagram illustrating an electronic device in a network environment according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4th generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
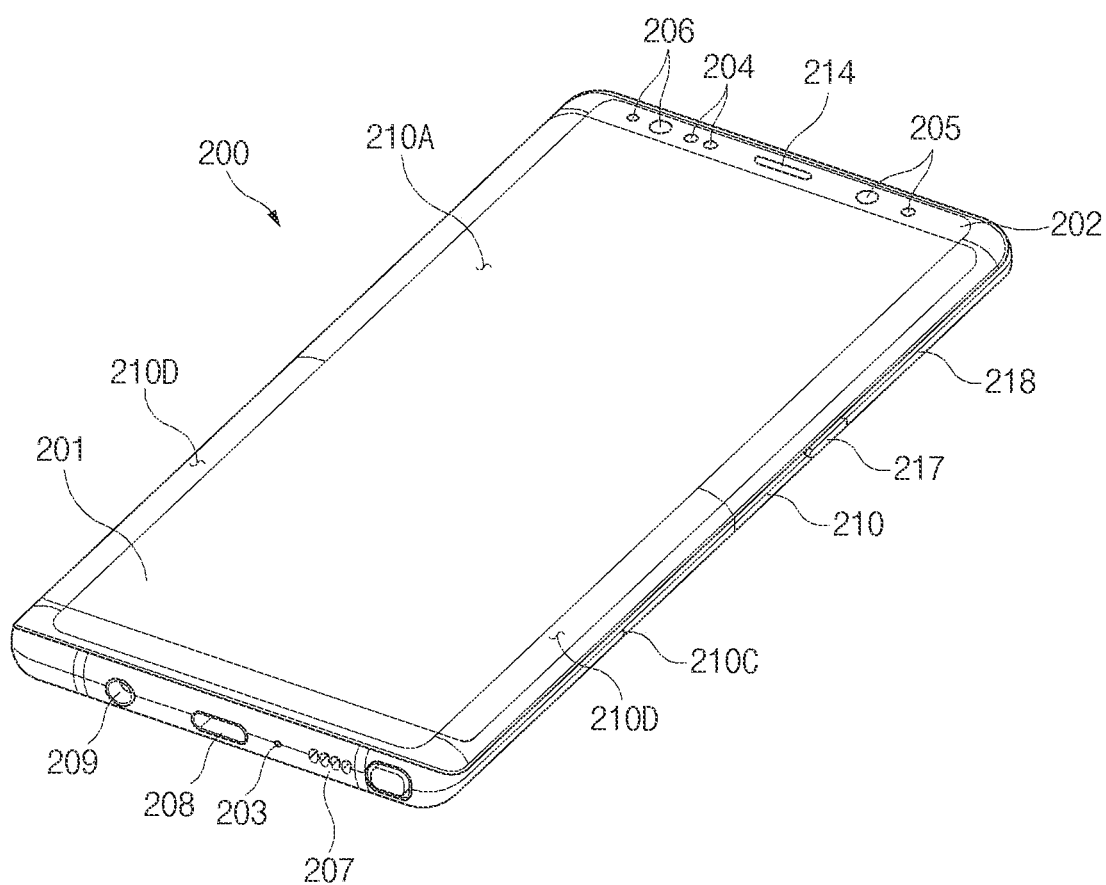
FIG. 2 illustrates a perspective view of a front surface of an electronic device according to an embodiment of the disclosure.

FIG. 2 is a perspective view of a front surface of an electronic device 200 (e.g., the electronic device 101 of FIG. 1) according to an embodiment of the disclosure.

Figure 3:
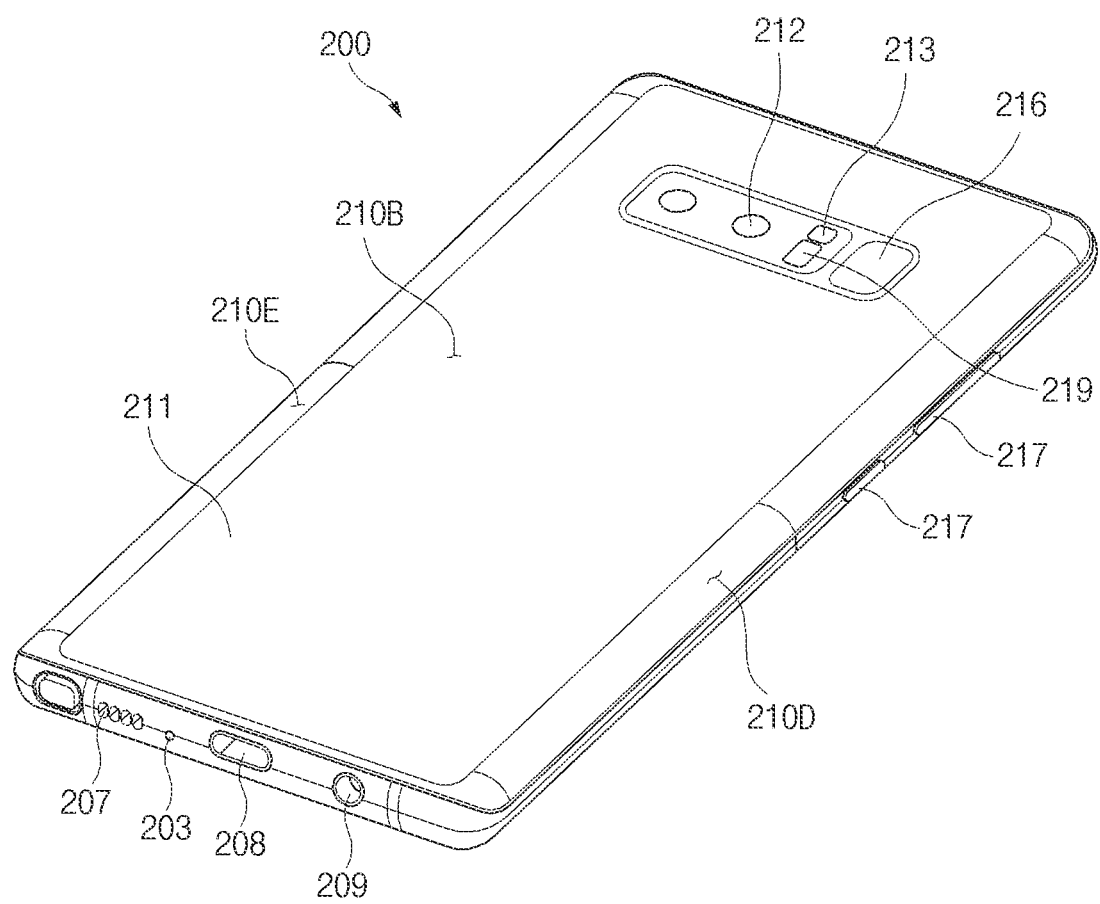
FIG. 3 illustrates a perspective view of a rear surface of an electronic device according to an embodiment of the disclosure.

FIG. 3 is a perspective view of a rear surface of the electronic device 200 according to an embodiment of the disclosure.

Referring to FIGS. 2 and 3, the electronic device 200 according to an embodiment may include a housing 210 including a first surface (or a front surface) 210A, a second surface (or a rear surface) 210B, and a side surface 210C that surrounds a space between the first surface 210A and the second surface 210B. In another embodiment (not illustrated), the housing may refer to a structure that defines some of the first surface 210A, the second surface 210B, and the side surface 210C of FIG. 2. According to an embodiment, the first surface 210A may be defined by a front plate 202 (e.g., a glass plate or a polymer plate including various coating layers), at least a portion of which is substantially transparent. The second surface 210B may be defined by a substantially opaque rear plate 211. The rear plate 211, for example, may be formed of coated or colored glass, ceramics, a polymer, a metal (e.g., aluminum, stainless steel (STS), or magnesium), or a combination of at least two thereof. The side surface 210C may be coupled to the front plate 202 and the rear plate 211, and may be defined by a side bezel structure (or 'a side member') 218 including a metal and/or a polymer. In some embodiments, the rear plate 211 and the side bezel structure 218 may be integrally formed and may include the same material (e.g., a metallic material such as aluminum).

In the illustrated embodiment, the front plate 202 may include two first areas 210D that are deflected from the first surface 210A toward the rear plate 211 and extend seamlessly, at opposite ends of a long edge of the front plate 202. In the illustrated embodiment (see FIG. 3), the rear plate 211 may include two second areas 210E that are deflected from the second surface 210B toward the front plate 202 and extend seamlessly, at opposite ends of a long edge of the rear plate 211. In some embodiments, the front plate 202 (or the rear plate 211) may include only one of the first areas 210D (or the second areas 210E). In other embodiments, some of the first areas 210D or the second areas 210E may not be included. In the embodiments, when viewed from a side of the electronic device 200, the side bezel structure 218 may have a first thickness (width) on a side surface, on which neither the first areas 210D nor the second areas 210E are included, and may have a second thickness that is smaller than the first thickness on a side surface, on which the first areas 210D or the second areas 210E are included.

In an embodiment, at least one antenna radiator (e.g., a conductive pattern) may be disposed in the side member (e.g., the side bezel structure 218 of FIG. 3) of the housing 210 of the electronic device 200, the two first areas 210D deflected from the first surface 210A of the front plate 202 toward the rear plate 211 and extending seamlessly, or the two areas (e.g., the first area 210D and the second area 210E) deflected from the second surface 210B of the rear plate 211 toward the front plate 202 and extending seamlessly.

In an embodiment, the first area 210D or the second area 210E may be planar to define substantially one plane with the first surface 210A or the second surface 210B without being deflected.

In an embodiment, at least one antenna radiator may radiate a signal of a specific frequency band. In an embodiment, at least one antenna radiator may be an auxiliary radiator. For example, at least one antenna radiator may radiate a signal pertaining to a 5G Sub-6 frequency band of about 3.5 GHz to about 6 GHz, such as n41, n78, and/or n79. For another example, at least one antenna radiator may radiate a frequency of a Wi-Fi frequency band. The Wi-Fi frequency band may include a frequency band, such as 802.11a and/or 802.11b.

In an embodiment, at least one antenna radiator may be a main radiator. In an embodiment, some of frequency bands radiated by the main radiator and some frequency bands radiated by the auxiliary radiator may be the same, and the remaining ones thereof may be different.

In an embodiment, as another example, at least one antenna radiator may radiate a frequency of a mmWave frequency band. For example, the mmWave frequency band may include a frequency band, such as about 24 to 34 GHz and/or about 37 to 44 GHz. As another example, at least one antenna radiator may radiate a frequency of a frequency band of 11ay.

According to an embodiment, the electronic device 200 may include at least one of a display 201 (e.g., the display module 160 of FIG. 1), audio modules 203, 207, and 214 (e.g., the audio module 170 of FIG. 1), sensor modules 204, 216, and 219 (e.g., the sensor module 176 of FIG. 1), camera modules 205, 212, and 213 (e.g., the camera module 180 of FIG. 1), a key input device 217, a light emitting element 206, and connector holes 208 and 209. In some embodiments, at least one (e.g., the key input device 217 or the light emitting element 206) of the elements may be omitted from the electronic device 200 or another component may be additionally included in the electronic device 200.

The display 201, for example, may be visually exposed through a c considerable portion of the front plate 202. In some embodiments, at least a portion of the display 201 may be exposed through the front plate 202 that defines the first surface 210A, and at least a portion of the first areas 210D and the second areas 210E of the side surface 210C. In some embodiments, corners of the display 201 may have a shape that is substantially the same as the adjacent outer shape of the front plate 202. In other embodiments (not illustrated), to expand the area, by which the display 201 is visually exposed, the intervals between the outskirts of the display 201 and the outskirts of the front plate 202 may be substantially the same.

In other embodiments (not illustrated), a portion of the screen display area of the display 201 may have a recess or an opening, and may include at least one of the audio module 214, the sensor module 204, the camera module 205, and the light emitting element 206, which are aligned with the recess or the opening. In other embodiments (not illustrated), at least one of the audio module 214, the sensor module 204, the camera module 205, the fingerprint sensor 216, and the light emitting element 206 may be included on the rear surface of the screen display area of the display 201. In other embodiments (not illustrated), the display 201 may be coupled to or be disposed to be adjacent to a touch detection circuit, a pressure sensor that may measure the strength (the pressure) of a touch, and/or a digitizer that detects a stylus pen of a magnetic field type. In some embodiments, at least a portion of the sensor modules 204 and 219 and/or at least a portion of the key input device 217 may be disposed in the first areas 210D and/or the second areas 210E. In another example, a partial area of a screen display area of the display 201 may include another pixel structure, another pixel density, and/or another wiring structure as compared with another area, and may include at least one of the audio module 214, the sensor module 204, the camera module 205, and the light emitting element 206 disposed at a location that is aligned with the partial area.

The audio modules 203, 207, and 214 may include the microphone hole 203 and the speaker holes 207 and 214. A microphone for acquiring external sounds may be disposed in the microphone hole 203, and in some embodiments, a plurality of microphones may be disposed to detect the direction of a sound. The speaker holes 207 and 214 may include the external speaker hole 207 and the call receiver hole 214. In some embodiments, the speaker holes 207 and 214 and the microphone hole 203 may be implemented by one hole or a speaker may be included while a speaker hole 207 or 214 is not employed (e.g., a piezoelectric speaker).

The sensor modules 204, 216, and 219 may generate an electrical signal or a data value corresponding to an operational state of the interior of the electronic device 200 or an environmental state of the outside. The sensor modules 204, 216, and 219, for example, may include the first sensor module 204 (e.g., a proximity sensor) and/or a second sensor module (not illustrated) (e.g., a fingerprint sensor) disposed on the first surface 210A of the housing 210, and/or the third sensor module 219 (e.g., a HRM sensor) and/or the fourth sensor module 216 (e.g., a fingerprint sensor) disposed on the second surface 210B of the housing 210. The fingerprint sensor may be disposed not only on the first surface 210A (e.g., the display 201) but also on the second surface 210B of the housing 210. The electronic device 200 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor 204.

The camera modules 205, 212, and 213 may include the first camera device 205 disposed on the first surface 210A of the electronic device 200, and the second camera device 212 and/or the flash 213 disposed on the second surface 210B. The camera modules 205 and 212 may include one or a plurality of lenses, an image sensor, and/or an image signal processor. The flash 213, for example, may include a light emitting diode or a xenon lamp. In some embodiments, two or more lenses (an infrared ray camera or a wide angle/telephoto lens), and image sensors may be disposed on one surface of the electronic device 200.

The key input device 217 may be disposed on the side surface 210C of the housing 210. In another embodiment, the electronic device 200 may not include some or all of the above-mentioned key input devices 217, and the key input devices 217, which are not included, may be implemented in different forms, such as a soft key, on the display 201. In some embodiments, the key input device may include the sensor module 216 disposed on the second surface 210B of the housing 210.

The light emitting element 206, for example, may be disposed on the first surface 210A of the housing 210. The light emitting element 206, for example, may provide state information on the electronic device 200 in the form of light. In other embodiments, the light emitting element 206, for example, may provide a light source that interworks with an operation of the camera module 205. The light emitting element 206, for example, may include a light emitting diode (LED), an IR LED, and/or a xenon lamp.

The connector holes 208 and 209 may include the first connector hole 208 that may accommodate a connector (e.g., a USB connector) for transmitting and receiving electric power and/or data to and from an external electronic device and/or the second connector hole (e.g., an earphone jack) 209 that may accommodate a connector for transmitting and receiving an audio signal to and from the external electronic device.

Figure 4:
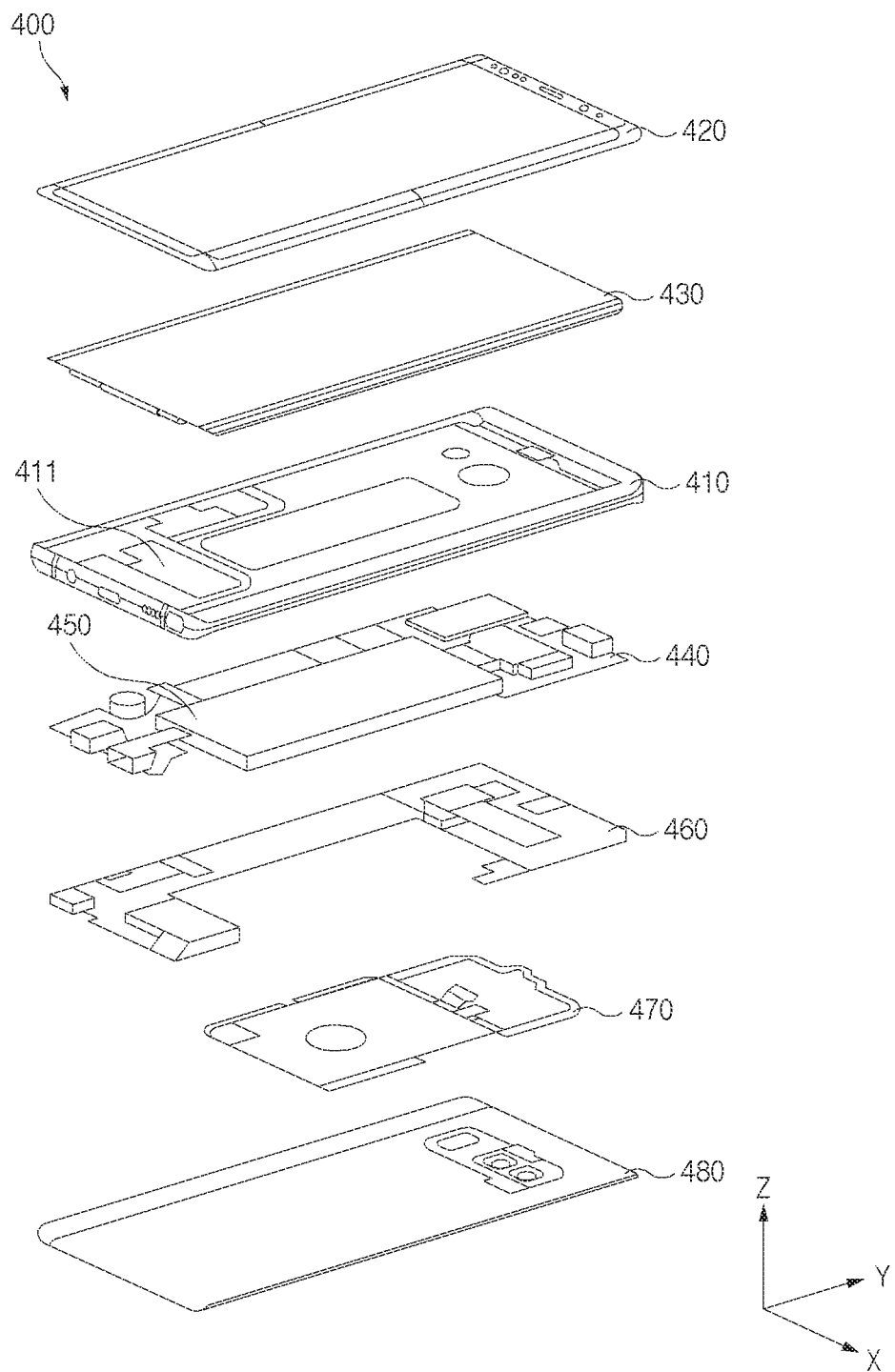
FIG. 4 illustrates an exploded perspective view of an electronic device according to an embodiment of the disclosure.

FIG. 4 is an exploded perspective view 400 of an electronic device (e.g., the electronic device 200 of FIG. 2 and/or FIG. 3) according to an embodiment of the disclosure. Referring to FIG. 2, the electronic device 200 may include a side bezel structure 410 (e.g., the side bezel structure 218 of FIG. 2), a first support member 411 (e.g., the bracket), a front plate 420, a display 430 (e.g., the display 201 of FIG. 2), a PCB 440, a battery 450, a second support member 460 (e.g., the rear case), a short range antenna 470, and/or a rear plate 480 (e.g., the rear plate 211 of FIG. 3). In some embodiments, at least one (e.g., the first support member 411 or the second support member 460) of the elements may be omitted from the electronic device 200 or another component may be additionally included in the electronic device 200. At least one of the components of the electronic device 200 may be the same as or similar to at least one of the components of the electronic device 200 of FIG. 2 or FIG. 3, and a repeated description thereof will be omitted.

Referring to FIG. 4, according to an embodiment, the side bezel structure 410 may include one or more conductive members that surround a space between the front plate 420 and the rear plate 480 of the electronic device 200 and are spaced apart from each other by a division part. For example, the side bezel structure 410 may include a plurality of conductive members that are spaced apart from each other by at least one division part. The electronic device 200 may include a structure that protrudes from at least one end and/or one point of the plurality of conductive members toward the interior of the housing (e.g., the housing 210 of FIG. 2). For example, the electronic device 200 may include at least one connector that protrudes from at least one end and/or one point of the plurality of conductive members toward the interior of the housing and is physically connected to a support member (e.g., the first support member 411). As another example, the electronic device 200 may include a protrusion that protrudes from at least one end of the plurality of conductive members toward the interior of the housing and is electrically connected to at least one of the plurality of conductive members.

According to an embodiment, the first support member 411 may be disposed in a space between the front plate 420 and the rear plate 480. The first support member 411 may be disposed in the interior of the electronic device 200 to be connected to the side bezel structure 410 or to be integrally formed with the side bezel structure 410. The first support member 411, for example, may be formed of a metallic material and/or a nonmetallic material (e.g., a polymer). In an embodiment, the display 430 may be disposed on a first surface (e.g., one surface that faces the +z axis direction) of the first support member 411, and the PCB 440 may be disposed on a second surface (e.g., one surface that faces the −z axis direction) that faces an opposite direction to the first surface.

According to an embodiment, a processor (e.g., the processor 120 of FIG. 1), a memory (e.g., the memory 130 of FIG. 1), an interface (e.g., the interface 177 of FIG. 1), an antenna module (not illustrated), and/or a wireless communication circuit (e.g., the wireless communication module 192 of FIG. 1) may be disposed in the PCB 440. The processor 120, for example, may include one or more of a central processing unit (CPU), an application processor (AP), a graphic processing unit (GPU), an image signal processor (ISP), a sensor hub processor (SHP), or a communication processor (CP). The memory, for example, may include a volatile and/or nonvolatile memory. The interface, for example, may include a high definition multimedia interface (HDMI), a universal serial bus (USB), an SD card interface, and/or an audio interface. The interface, for example, may electrically or physically connect the electronic device 200 to an external electronic device (e.g., the electronic device 102 and 104 of FIG. 1), and may include a USB connector, an SD card/MMC connector, or an audio connector. The wireless communication circuit may be a radio frequency integrated circuit (RFIC). For example, the wireless communication circuit may feed an electrical signal to the protrusion formed at least a portion of the housing.

The antenna module, for example, may include at least one patch antenna. The antenna module may be configured to radiate a frequency of a specific frequency band (e.g., a mmWave frequency band). For example, the antenna module may be electrically connected to the wireless communication circuit mounted on the PCB 440. The antenna module may receive an electrical signal (e.g., a base band signal or an intermediate frequency (IF) signal) of a specific frequency band from the wireless communication circuit disposed in the PCB 440. The antenna module may amplify the electrical signal received by using at least one circuit (e.g., an RFIC), and may provide electric power to at least one radiator included in the antenna module.

According to an embodiment, the battery 450 is a device for supplying electric power to at least one component of the electronic device 200, and for example, may include a primary battery that cannot be recharged, a secondary battery that may be recharged, or a fuel cell. At least a portion of the battery 450, for example, may be disposed substantially in parallel to the PCB 440. The battery 450 may be integrally disposed in the interior of the electronic device 200, and may be disposed to be detachable from the electronic device 200.

According to an embodiment, the short range antenna 470 may be disposed between the rear plate 480 and the battery 450. The antenna 470, for example, may include a near field communication (NFC) antenna, a wireless charging antenna, and/or a magnetic secure transmission (MST) antenna. The antenna 470, for example, may perform short-range communication with an external device, or may wirelessly transmit and receive electric power that is necessary for charging. In another embodiment, an antenna structure may be formed by one or a combination of the side bezel structure 410 and/or the first support member 411. Hereinafter, various antenna structures of the electronic device will be described.

Figure 5:
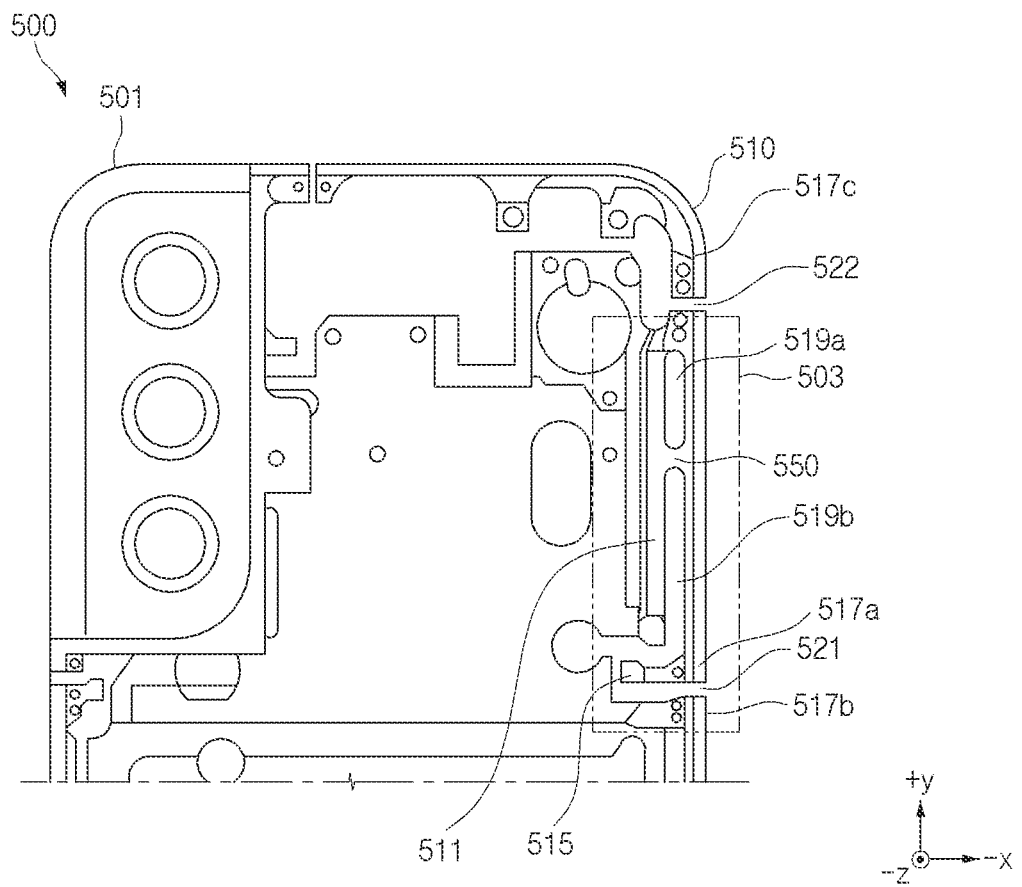
FIG. 5 illustrates a structure of an electronic device including a plurality of openings according to an embodiment of the disclosure.

FIG. 5 illustrates a structure 500 of an electronic device 501 including a plurality of openings according to an embodiment of the disclosure.

Referring to FIG. 5, according to an embodiment, the electronic device 501 (e.g., the electronic device 101 of FIG. 1) may include a side member 510 (e.g., the side bezel structure 410 of FIG. 4). The side member 510 may correspond to at least a portion of a housing that defines an external appearance of the electronic device 501. The side member 510 may include a plurality of areas that are physically divided through at least one division part.

According to an embodiment, the side member 510 may include a first conductive member 517a, a second conductive member 517b, and/or a third conductive member 517c that are physically divided through a first division part 521 or a second division part 522. For example, the side member may further include a protrusion 515 formed to protrude from one end of at least one of the first conductive member 517a, the second conductive member 517b, and/or the third conductive member 517c in a direction (e.g., the +x direction) that faces an interior of the housing.

According to an embodiment, the electronic device 501 may include a support member 511 (e.g., the first support member 411 of FIG. 4). For example, the support member 511 may be disposed in a space between a first plate and a second plate. For example, a display exposed through at least a portion of the first plate may be disposed on a first surface (e.g., one surface that faces the +z direction) of the support member. As another example, an antenna module including at least one antenna (e.g., a patch antenna) may be disposed on a second surface (e.g., one surface that faces the −z direction) of the support member 511, which faces an opposite direction to the first surface.

Referring to an area corresponding to reference numeral 503, according to an embodiment, the electronic device 501 may have a structure including at least one opening (e.g., a first opening 519a or a second opening 519b) defined by the support member 511, the plurality of conductive members 517a, 517b, and/or 517c, and a connector 550. For example, the electronic device 501 may radiate an electric signal of a specific frequency band by using an antenna module disposed in an area that is adjacent to the first opening 519a or the second opening 519b.

Figure 14:
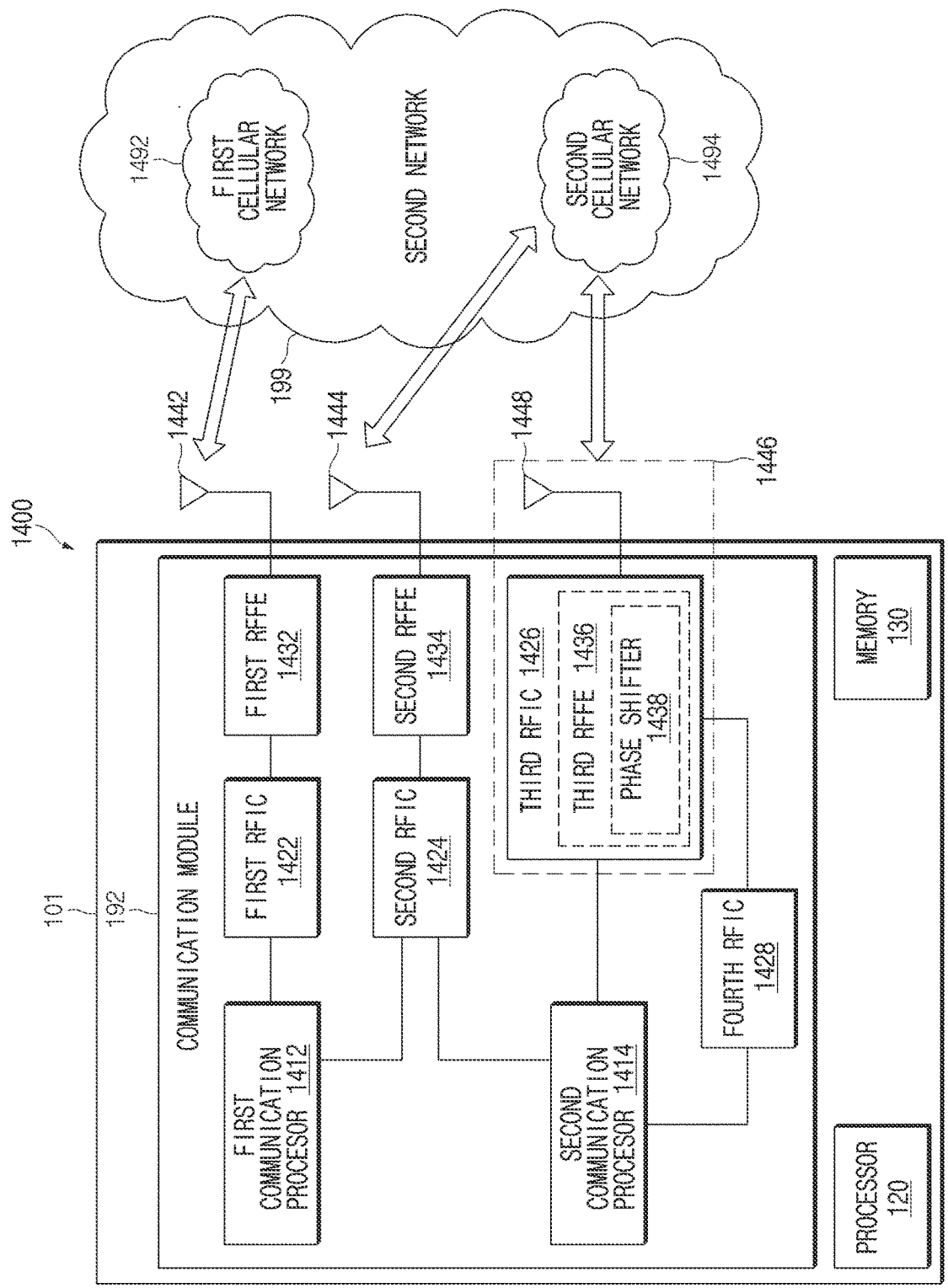
FIG. 14 is a block diagram of an electronic device for supporting a legacy network communication and a 5th generation (5G) network communication according to an embodiment of the disclosure.

According to an embodiment, the antenna module (e.g., a third antenna module 1446 of FIG. 14) may include a plurality of antennas, a printed circuit board, or an RFIC (e.g., a third RFIC 1426 of FIG. 14). For example, the plurality of antennas may constitute at least one array. The antenna module may transmit and/or receive an RF signal having a frequency of about 6 GHz to about 60 GHz.

According to an embodiment, the antenna module may transmit and/or receive a signal of a specific frequency band by using an opening (the first opening 519a or the second opening 519b) located in an area that is adjacent to the antenna module.

Hereinafter, in FIG. 6, a physical structure including an antenna module of an area corresponding to reference numeral 503 and at least one opening structure will be described in more detail.

Figure 6:
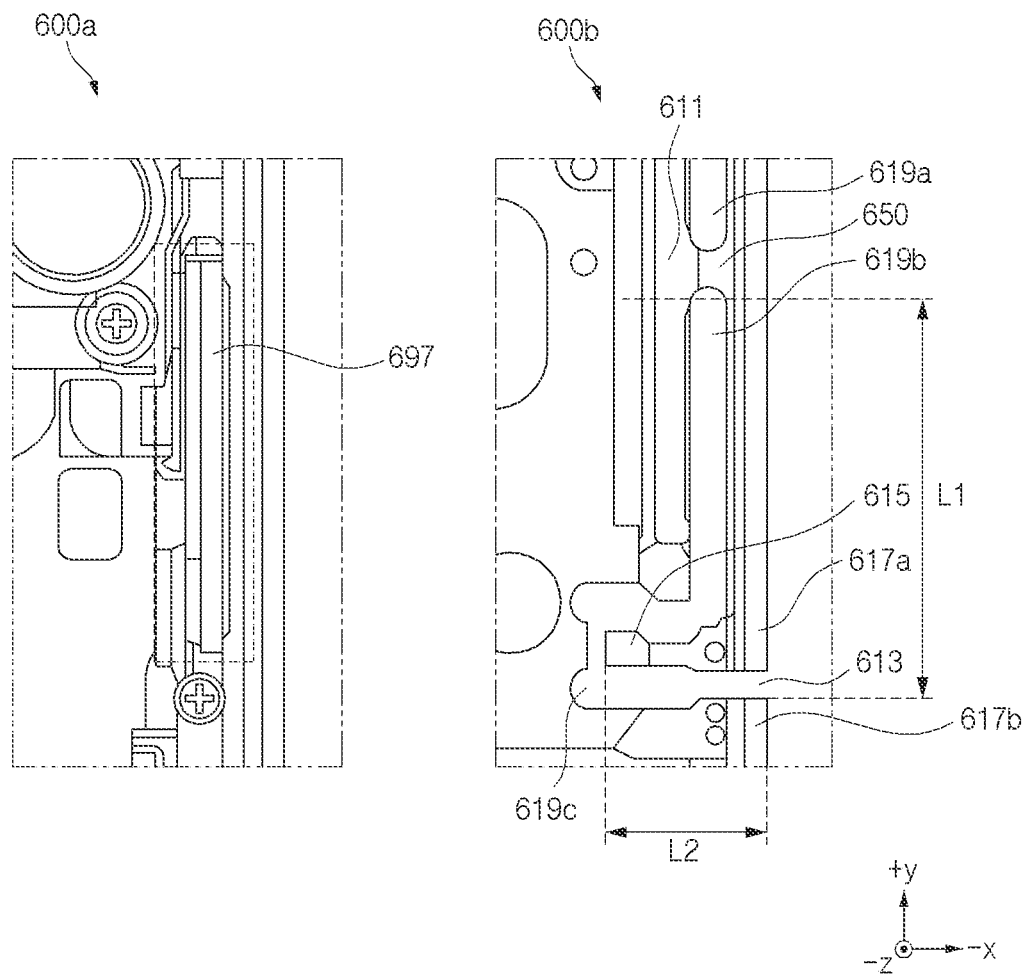
FIG. 6 illustrates a structure of an electronic device including an antenna module according to an embodiment of the disclosure.

FIG. 6 illustrates a structure of an electronic device including an antenna module 697 according to an embodiment of the disclosure.

Referring to reference numeral 600a of FIG. 6, according to an embodiment, an electronic device (e.g., the electronic device 101 of FIG. 1) may include the antenna module 697 disposed in an interior of a housing (e.g., the housing 210 of FIG. 2). The antenna module 697 may be supplied with electric power from a wireless communication circuit mounted on one surface of a PCB (e.g., the PCB 440 of FIG. 4) and transmit and/or receive a signal. The antenna module 697 may transmit and receive signals of various frequency bands. For example, a 5G network communication may be performed by using the antenna module 697. As an example, the antenna module 697 may communicate with an outside based on an electric signal of a specific frequency band (e.g., a 5G Sub-6 frequency band of about 3.5 GHz to about 6 GHz) such as n41, n78, and/or n79, and/or an ultra-high frequency mmWave band (e.g., 28 GHz or 39 GHz). The antenna module 697 may include at least one antenna. For example, the antenna module 697 may form a directional beam by using at least one antenna included on one surface thereof.

Referring to reference numeral 600b of FIG. 6, according to an embodiment, the electronic device may include a plurality of openings defined by the housing (e.g., the housing 210 of FIG. 2) and at least one constituent element included in an interior of the housing. For example, the electronic device may include a first conductive member 617a extending from a first end that is one end adjacent to a division part 613 (e.g., the first division part 521 of FIG. 5) to the second end toward a third direction (e.g., the +y direction), as a portion of a side member (e.g., the side bezel structure 410 of FIG. 4) included in the housing. The first conductive member 617a may be physically spaced apart from a second conductive member 617b by the division part 613. The first conductive member 617a and the second conductive member 617b may correspond to a portion of the housing that defines an external appearance of the electronic device. As another example, the electronic device may include at least one connector 650 and/or a protrusion 615 that protrudes from one point of the first conductive member 617a toward a direction (e.g., the +x direction) that faces the interior of the housing. The electronic device may include a plurality of openings (e.g., a first opening 619a, a second opening 619b, and/or a third opening 619c) defined by the first conductive member 617a, a support member 611, the at least one connector 650, and/or the protrusion 615. The electronic device may include the second opening 619b, the third opening 619c defined by the support member 611 and the protrusion 615 along an outskirt of the protrusion 615, and the division part 613, when viewed from a second surface (e.g., one surface that faces the −z direction). For example, a distance L1 from the division part 613 to one end of the second opening 619b may be about 22 mm to about 23 mm. A distance L2 from one point of the first conductive member 617a to one end of the protrusion 615 may be about 8 mm to about 9 mm. For example, the electronic device may perform a legacy network communication including a 2nd generation (2G), a 3rd generation (3G), a 4th generation (4G), and/or long term evolution (LTE) network by using an antenna that uses the plurality of openings 619a, 619b, and/or 619c. According to an embodiment, an operation frequency of an antenna formed by using the first conductive member 617a, the second conductive member 617b, the support member 611, or the protrusion 615 may be changed according to the distance L1 or L2. As an example, the wireless communication circuit included in the electronic device may communicate with an outside by radiating an electric signal of a frequency band of about 700 MHz to about 3 GHz through the plurality of openings by using the antenna module 697. According to an embodiment, the second opening 619b and the third opening 619c may be one opening that is connected.

According to an embodiment, the wireless communication circuit included in the electronic device may indirectly supply electric power to the protrusion 615.

Hereinafter, an internal structure of the housing of the electronic device including the plurality of openings will be described with reference to FIGS. 7 to 10. An internal structure described in FIGS. 7 and 8 and an internal structure described in FIGS. 9 and 10 may be different.

Figure 7:
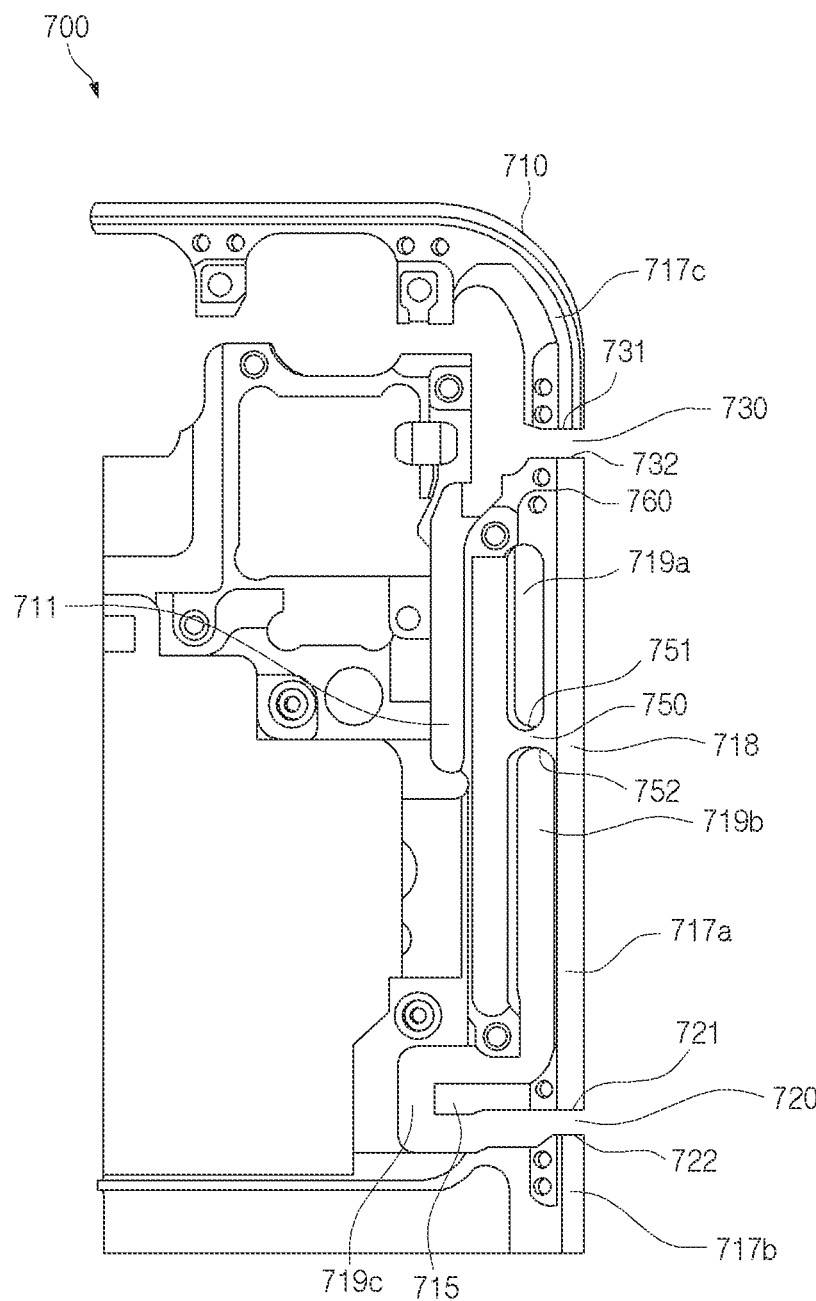
FIG. 7 illustrates a structure of an electronic device including a plurality of openings according to an embodiment of the disclosure.

FIG. 7 illustrates a structure 700 of an electronic device including a plurality of openings 719a, 719b, and 719c according to an embodiment of the disclosure.

Referring to FIG. 7, the electronic device (e.g., the electronic device 101 of FIG. 1) may radiate a frequency signal of a specific band by using at least some of the plurality of openings 719a, 719b, and/or 719c defined by at least one constituent element (e.g., a first conductive member 717a, a support member 711, a protrusion 715, a first connector 750, and a second connector 760). For example, the electronic device may include a housing (e.g., the housing 210 of FIG. 2). The housing may include a first plate (e.g., the front plate 420 of FIG. 4) that faces the first direction (e.g., the +z direction), a second plate (e.g., the rear plate 480 of FIG. 4) that faces the second direction (e.g., the −z direction), and a side member 710 (e.g., the side bezel structure 410 of FIG. 4) that connects one side of the first plate and one side of the second plate. As another example, the electronic device may further include the support member 711 disposed in a space between the first plate and the second plate, a display disposed on a first surface of the support member 711 and visually exposed through at least a portion of the first plate, an antenna module (e.g., the antenna module 697 of FIG. 6) disposed on a second surface that faces an opposite direction to the first surface of the support member 711 and including at least one patch antenna, or a PCB (e.g., the PCB 440 of FIG. 4) disposed on the second surface of the support member 711. As an example, at least one wireless communication circuit may be disposed in the PCB. The wireless communication circuit may be electrically connected to the protrusion 715 and/or the antenna module to supply electric power.

According to an embodiment, the side member may have a structure including a plurality of conductive members that are physically divided through at least one division part. For example, the side member may include the first conductive member 717a that extends from a first end 721 to a second end 732 toward the third direction (e.g., the +y direction). For example, the side member may include the first conductive member 717a, a second conductive member 717b that is physically spaced apart by a first division part 720 formed in an area that is adjacent to the first end 721 of the first conductive member 717a, and a third conductive member 717c that is physically spaced by a second division part 730 formed in an area that is adjacent to the second end 732 of the first conductive member 717a. The second conductive member 717b may extend from one end 722 toward a fourth direction (e.g., the −y direction) that is an opposite direction to the third direction. At least a portion of the third conductive member 717c may extend from one end 731 toward the third direction. The plurality of conductive members 717a, 717b, and 717c may be included in a portion of the side member 710 that defines an external appearance of the electronic device.

According to an embodiment, the electronic device may include a plurality of connectors that physically connect the first conductive member 717a and the support member 711. For example, the electronic device may include the first connector 750 formed to protrude from one point 718 between the first end 721 and the second end 732 of the first conductive member 717a in a direction that faces the interior of the housing and physically connected to the support member 711. As another example, the electronic device may include the second connector 760 formed to protrude from the second end 732 of the first conductive member 717a in a fourth direction that faces the interior of the housing, and physically connected to the support member 711.

According to an embodiment, the electronic device may include the protrusion 715 formed to extend from the first conductive member 717a. For example, the electronic device may include the protrusion 715 formed to protrude from the first end 721 of the first conductive member 717a in a direction (e.g., the +x direction) that faces the interior of the housing, and electrically connected to the first conductive member 717a. The protrusion 715 may be supplied with electric power from the wireless communication circuit mounted on the PCB. For example, the protrusion 715 may be physically connected to the PCB through at least one conductive elastic body (e.g., C-clip and/or a pogo pin), and may be supplied with electric power from the wireless communication circuit mounted on the PCB through the conductive elastic body.

According to an embodiment, the electronic device may include a plurality of openings (e.g., the first opening 719a, the second opening 719b, and/or the third opening 719c) defined by at least one constituent element. For example, the first opening 719a may be defined by the first conductive member 717a, the support member 711, the first connector 750, and/or the second connector 760. As another example, the second opening 719b may be defined by the first conductive member 717a, the support member 711, the first connector 750, and/or the protrusion 715. The first opening 719a may extend from a first end 751 of the first connector 750 in the first direction by a specific distance. The second opening 719b may extend from a second end 752 of the first connector 750 in the fourth direction by a specific distance. For example, lengths or shapes of the first opening 719a and the second opening 719b may be different according to a coupling point of the first connector 750. Furthermore, as another example, the third opening 719c may be defined by the support member 711 and the protrusion 715 along an outskirt of the protrusion 715. For example, a nonconductive material may be filled in at least one area of the plurality of openings. For example, classification of the second opening 719b, the third opening 719c, and/or the first division part 720 may be classification of logical areas.

According to an embodiment, the electronic device may further include an antenna module disposed at a location corresponding to the first opening 719a and/or the second opening 719b. The contents regarding the internal structure of the housing of the electronic device including the antenna module may be further described with reference to FIG. 8, which will be described below.

Figure 8:
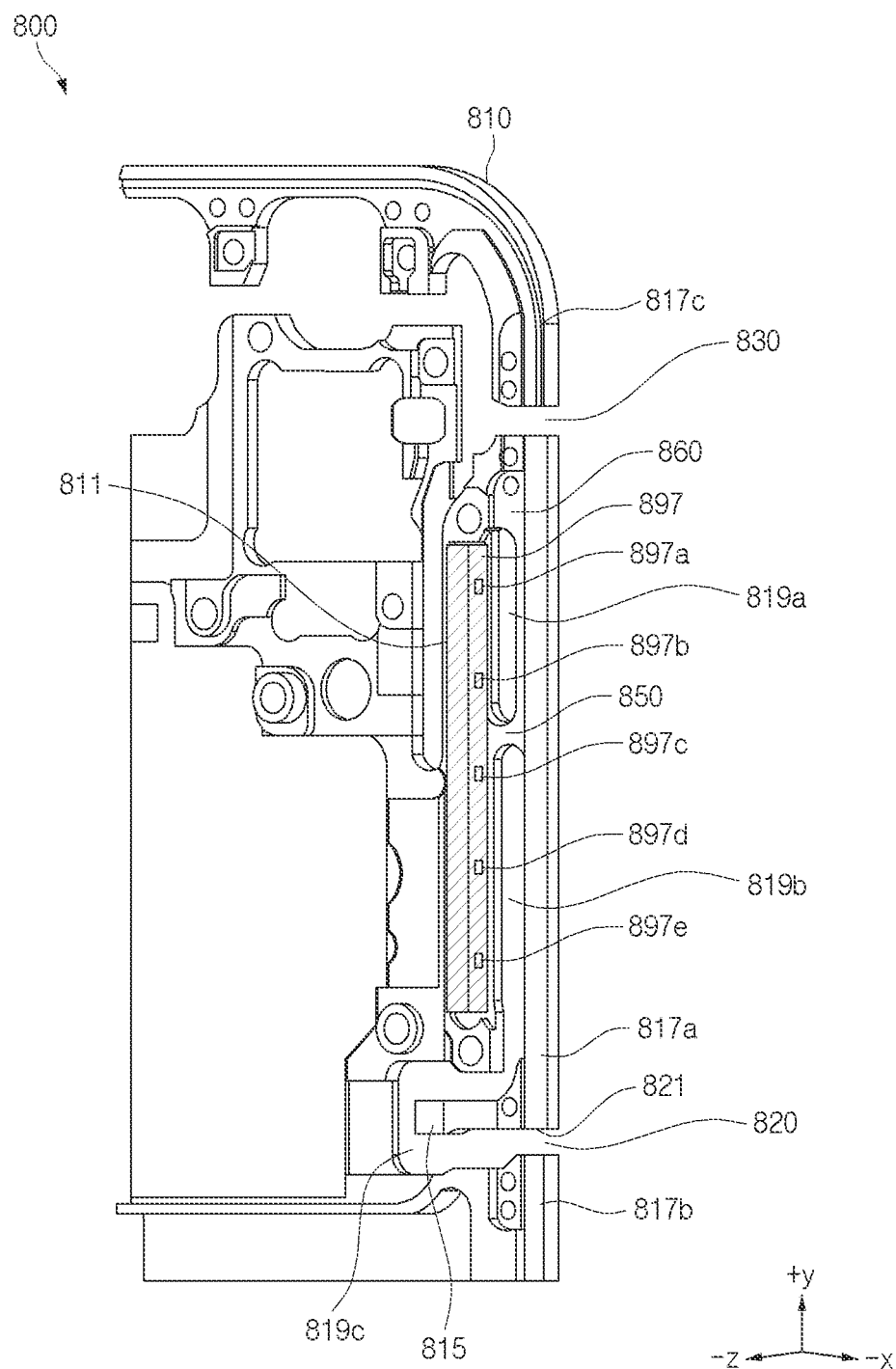
FIG. 8 illustrates a structure of an electronic device including an antenna module according to an embodiment of the disclosure.

FIG. 8 illustrates a structure of an electronic device 800 including an antenna module 897 according to an embodiment of the disclosure.

Referring to FIG. 8, according to an embodiment of the disclosure, the electronic device (e.g., the electronic device 101 of FIG. 1) may include the antenna module 897 disposed in an interior of a side member 810 (e.g., the side bezel structure 410 of FIG. 4). The antenna module 897 may be disposed at a location corresponding to a plurality of openings (e.g., a first opening 819a and/or a second opening 819b) defined by at least one constituent element included in the electronic device. The side member 810 included in the electronic device may include a plurality of conductive members (e.g., a first conductive member 817a, a second conductive member 817b, and/or a third conductive member 817c) that are physically spaced apart from each other by at least one division part (e.g., a first division part 820 and a second division part 830). For example, the electronic device may include a protrusion 815 formed to protrude from the first end 821 of the first conductive member 817a in a direction (e.g., the +x direction of FIG. 8) that faces the interior of the housing, and electrically connected to the first conductive member 817a. The electronic device may include a first connector 850 formed to protrude from one point of the first conductive member 817a in the second direction toward the interior of the housing, and physically connected to a support member 811. The electronic device may include a second connector 860 formed to protrude from one end (e.g., the second end 732 of FIG. 7) of the first conductive member 817a in a direction that faces the interior of the housing, and physically connected to the support member 811.

According to an embodiment, the electronic device may include a plurality of openings (e.g., the first opening 819a, the second opening 819b, and/or the third opening 819c) defined by a plurality of constituent elements. For example, a nonconductive material may be filled in at least one area of the plurality of openings. The description of the structures of the plurality of openings may be replaced by the description of FIG. 7, which has been described above.

According to an embodiment, the antenna module 897 disposed in the interior of the housing of the electronic device may be disposed at a location corresponding to at least some of the plurality of openings. For example, the antenna module 897 may be disposed at a location corresponding to one area of the first opening 819a and/or the second opening 819b. The antenna module 897 may include at least one antenna (e.g., a first patch antenna 897a, a second patch antenna 897b, a third patch antenna 897c, a fourth patch antenna 897d, and/or a fifth patch antenna 897e). For example, the at least one antenna 897a to 897e may be disposed to form beam pattern in the −x axis direction. Then, one end of the first connector 850, which is connected to the support member 811, may be disposed to correspond to one point between two adjacent ones of the at least one antenna (e.g., the first to fifth patch antennas 897a to 897e) when viewed from the second surface (e.g., one surface that faces the −z direction). For example, in FIG. 8, one end of the first connector 850, which is connected to the support member 811, may be disposed to correspond to one point between the second patch antenna 897b and the third patch antenna 897c.

Hereinafter, an internal structure of another housing of the electronic device including a plurality of openings will be described with reference to FIGS. 9 and 10. The internal structure of the housing of the electronic device, which is described with reference to FIGS. 9 and 10, may include constituent elements that are similar to those of the internal structure illustrated in FIGS. 7 and 8.

Figure 9:
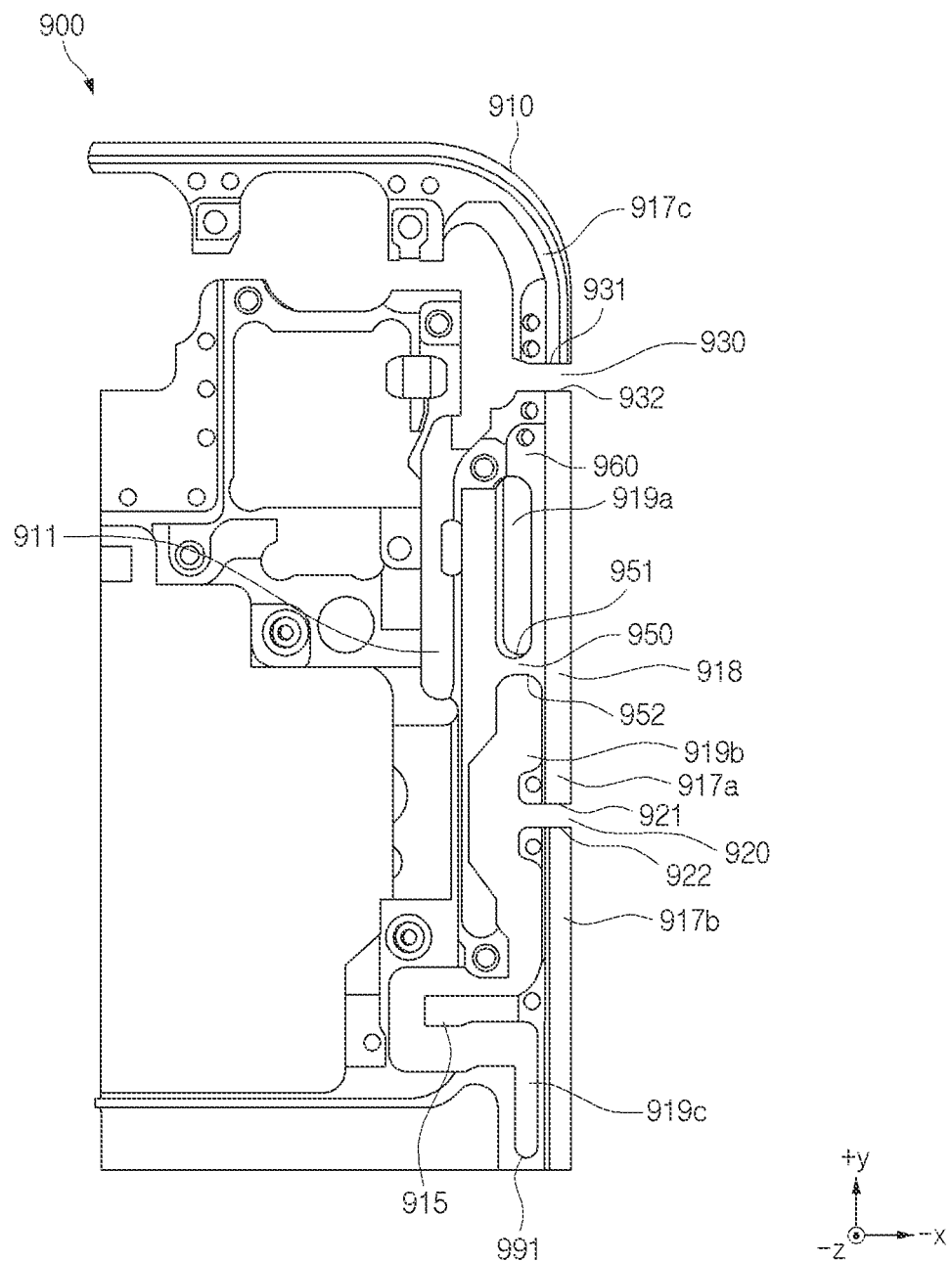
FIG. 9 illustrates a structure of an electronic device including a plurality of openings according to an embodiment of the disclosure.

FIG. 9 illustrates a structure 900 of an electronic device including a plurality of openings 919a, 919b, and 919c according to an embodiment of the disclosure.

Referring to FIG. 9, according to an embodiment of the disclosure, the electronic device (e.g., the electronic device 101 of FIG. 1) may radiate a frequency signal of a specific band by using an antenna that uses at least some of the plurality of openings 919a, 919b, and 919c defined by at least one constituent element. For example, the electronic device may include a housing (e.g., the housing 210 of FIG. 2). The housing may include a first plate (e.g., the front plate 420 of FIG. 4) that faces the first direction (e.g., the +z direction), a second plate (e.g., the rear plate 480 of FIG. 4) that faces the second direction (e.g., the −z direction), and a side member 910 (e.g., the side bezel structure 410 of FIG. 4) that connects one side of the first plate and one side of the second plate. As another example, the electronic device may further include a support member 911 disposed in a space between the first plate and the second plate, a display disposed on a first surface of the support member 911 and visually exposed through at least a portion of the first plate, an antenna module (e.g., the antenna module 697 of FIG. 6) disposed on a second surface that faces an opposite direction to the first surface of the support member 911 and including at least one patch antenna, and a PCB (e.g., the PCB 440 of FIG. 4) disposed on the second surface of the support member 911. As an example, at least one wireless communication circuit may be disposed in the PCB. The wireless communication circuit may be electrically connected to a protrusion 915 and/or the antenna module to supply electric power.

According to an embodiment, the side member 910 may include a plurality of conductive members that are physically divided through at least one division part. For example, the side member 910 may include a first conductive member 917a that extends from a first end 921 to a second end 932 toward the third direction (e.g., the +y direction). For example, the side member 910 may include the first conductive member 917a, a second conductive member 917b that is physically spaced apart by a first division part 920 formed in an area that is adjacent to the first end 921 of the first conductive member 917a, and a third conductive member 917c that is physically spaced by a second division part 930 formed in an area that is adjacent to the second end 932 of the first conductive member 917a. The second conductive member 917b may extend from one end 922 toward a fourth direction (e.g., the −y direction) that is an opposite direction to the third direction. At least a portion of the third conductive member 917c may extend from one end 931 toward the third direction. The plurality of conductive members 917a, 917b, and 917c may be included in a portion of the side member 910 that defines an external appearance of the electronic device.

According to an embodiment, the electronic device may include a plurality of connectors that physically connect the first conductive member 917a and the support member 911. For example, the electronic device may include a first connector 950 formed to protrude from one point 918 between the first end 921 and the second end 932 of the first conductive member 917a in a direction that faces the interior of the housing and physically connected to the support member 911. As another example, the electronic device may include a second connector 960 formed to protrude from one point between the second end 932 of the first conductive member 917a in a direction that faces the interior of the housing, and physically connected to the support member 911.

According to an embodiment, the electronic device may include the protrusion 915 formed to extend from the second conductive member 917b. For example, the electronic device may include the protrusion 915 formed to protrude from one point that is spaced apart from a first end 922 of the second conductive member 917b, which is adjacent to the first division part 920, in the fourth direction (e.g., the −y direction) that is an opposite direction to the third direction (e.g., the +y direction) by a specific distance, in a direction that faces the interior of the housing, and electrically connected to the second conductive member 917b. The protrusion 915 may be supplied with electric power from the wireless communication circuit mounted on the PCB. For example, the protrusion 915 may be physically connected to the PCB through at least one conductive elastic body (e.g., C-clip and/or a pogo pin), and may be supplied with electric power from the wireless communication circuit mounted on the PCB through the conductive elastic body.

According to an embodiment, the electronic device may include a plurality of openings (e.g., the first opening 919a, the second opening 919b, and/or the third opening 919c) defined by at least one constituent element. For example, the first opening 919a may be defined by the first conductive member 917a, the support member 911, the first connector 950, and/or the second connector 960. As another example, the second opening 919b may be defined by the first conductive member 917a, the second conductive member 917b, the first connector 950, the support member 711, and/or the protrusion 915. The first opening 919a may extend from a first end 951 of the first connector 950 in the first direction by a specific distance. The second opening 919b may extend from a second end 952 of the first connector 950 in the fourth direction by a specific distance. For example, lengths or shapes of the first opening 919a and the second opening 919b may be different according to a location of the first connector 950. Furthermore, as another example, the third opening 919c may be defined by the support member 911, the second conductive member 917b, and the protrusion 915 along an outskirt of the protrusion 915. The third opening 919c may be formed along an outskirt of the protrusion 915, and may extend to one end 991 in a fifth direction by a specific distance. For example, a nonconductive material may be filled in at least one area of the plurality of openings. The electronic device may include the second opening 919b, the third opening 919c, and/or the first division part 920 when viewed from the second surface. For example, classification of the second opening 919b, the third opening 919c, and/or the first division part 920 may be classification of logical areas.

According to an embodiment, the electronic device may further include an antenna module disposed at a location corresponding to the first opening 919a and/or the second opening 919b. The contents regarding the internal structure of the housing of the electronic device including the antenna module may be further described with reference to FIG. 10, which will be described later.

Figure 10:
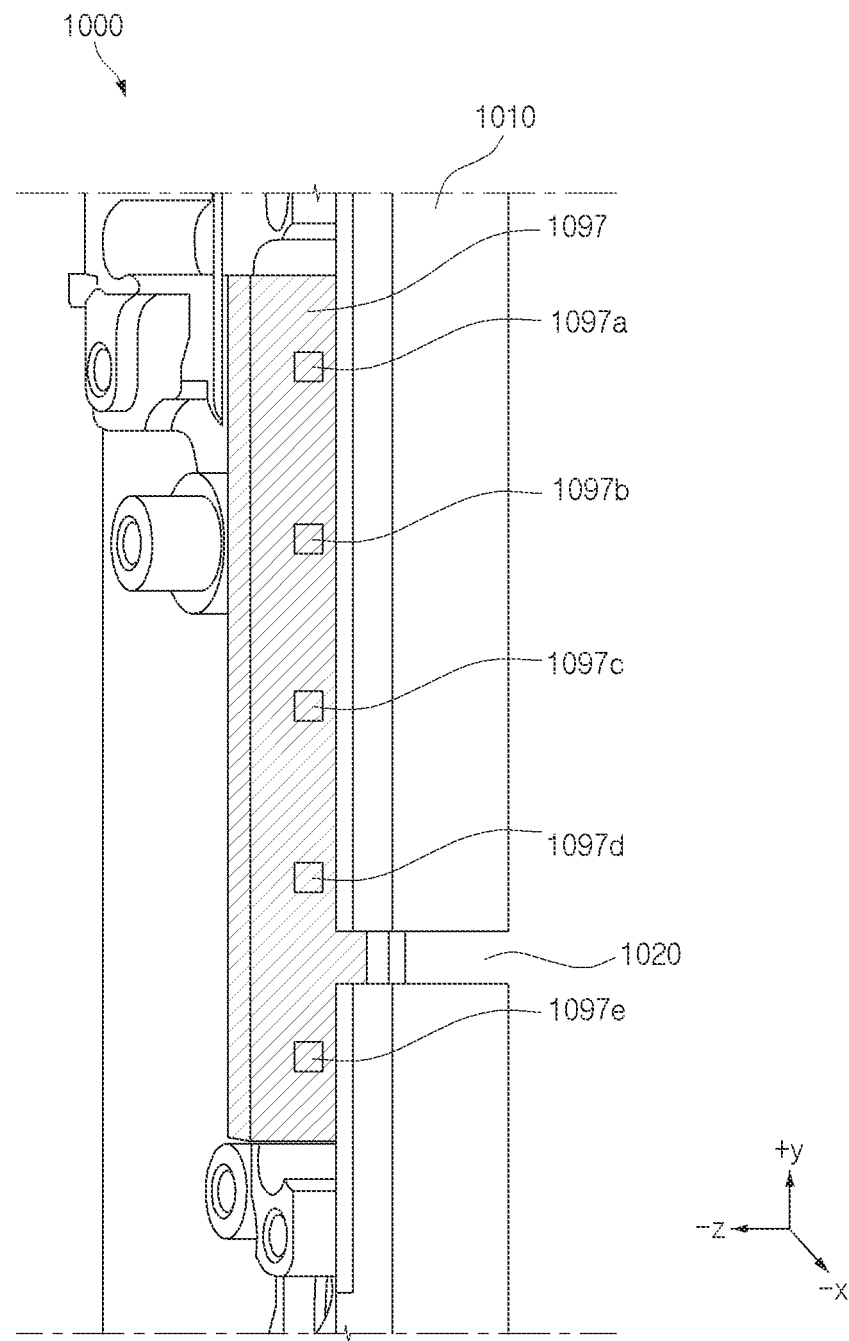
FIG. 10 illustrates a side surface of an electronic device including an antenna module according to an embodiment of the disclosure.

FIG. 10 illustrates a structure of an electronic device 1000 including an antenna module 1097 according to an embodiment of the disclosure.

Referring to FIG. 10, according to an embodiment of the disclosure, an electronic device (e.g., the electronic device 101 of FIG. 1) may include the antenna module 1097 disposed in an interior of a housing (e.g., the housing 210 of FIG. 2). For example, the antenna module 1097 may correspond to a plurality of openings (e.g., the first opening 919a and/or the second opening 919b) defined by at least one constituent element included in the electronic device, and may be disposed at a location that is adjacent to the side member 1010 included in the housing.

According to an embodiment, the antenna module 1097 may be disposed at a location corresponding to at least a portion of the plurality of openings. For example, the antenna module may be disposed at a location corresponding to an area of a first opening (e.g., the first opening 919a of FIG. 9) and/or a second opening (e.g., the second opening 919b of FIG. 9). The antenna module 1097 may include at least one antenna (e.g., a first patch antenna 1097a, a second patch antenna 1097b, a third patch antenna 1097c, a fourth patch antenna 1097d, and/or a fifth patch antenna 1097e). The at least one antenna, for example, may include the first patch antenna 1097a, the second patch antenna 1097b, the third patch antenna 1097c, the fourth patch antenna 1097d, and/or the fifth patch antenna 1097e. For example, the at least one antenna 1097a to 1097e may be disposed in the antenna module 1097 to form a beam pattern from the side member 1010 toward a direction (the −x direction) that faces the outside of the housing. Then, one end of the first connector (e.g., the first connector 950 of FIG. 9), which is connected the support member (e.g., the support member 911 of FIG. 9), may be disposed to corresponding to one point between two adjacent patch antennas of the at least one antenna 1097a to 1097e when viewed from the second surface (e.g., one surface that faces the −z direction). For example, one end of the first connector, which is connected to the support member, may be disposed to correspond to one point between the second patch antenna 1097b and the third patch antenna 1097c. For example, a first division part 1020 may be formed in the −x direction with respect to one point between the fourth patch antenna 1097d and the fifth patch antenna 1097e.

According to an embodiment, the antenna module 1097 may be disposed not to overlap side member 1010 when the at least one antenna 1097a to 1097e included in the antenna module 1097 is viewed from the −x direction.

Figure 11:
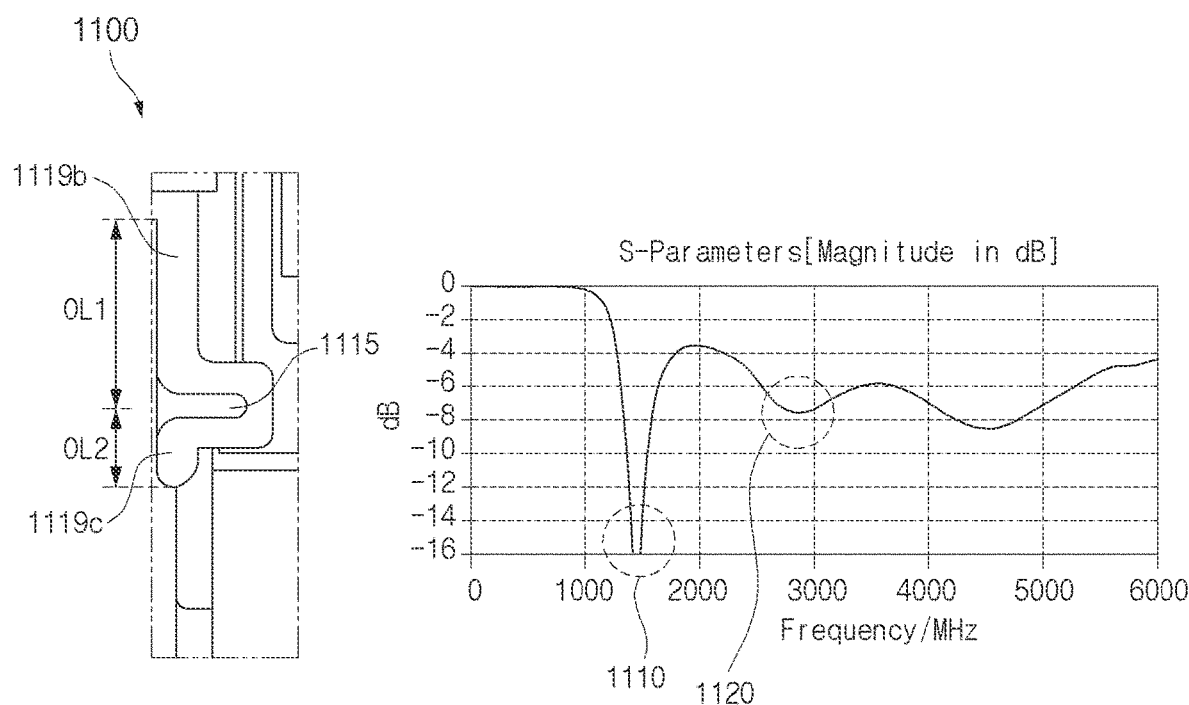
FIGS. 11, 12, and 13 illustrate radiation performances of an electronic device due to an internal structure thereof according to various embodiments of the disclosure.
Figure 12:
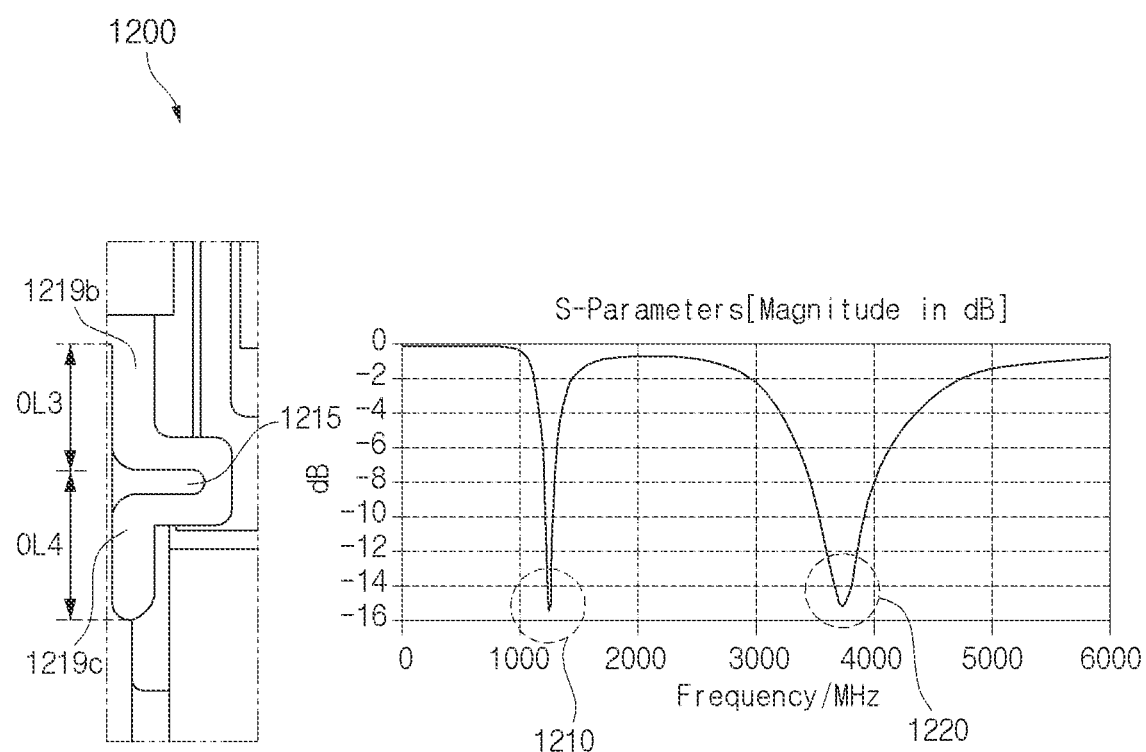
Figure 13:
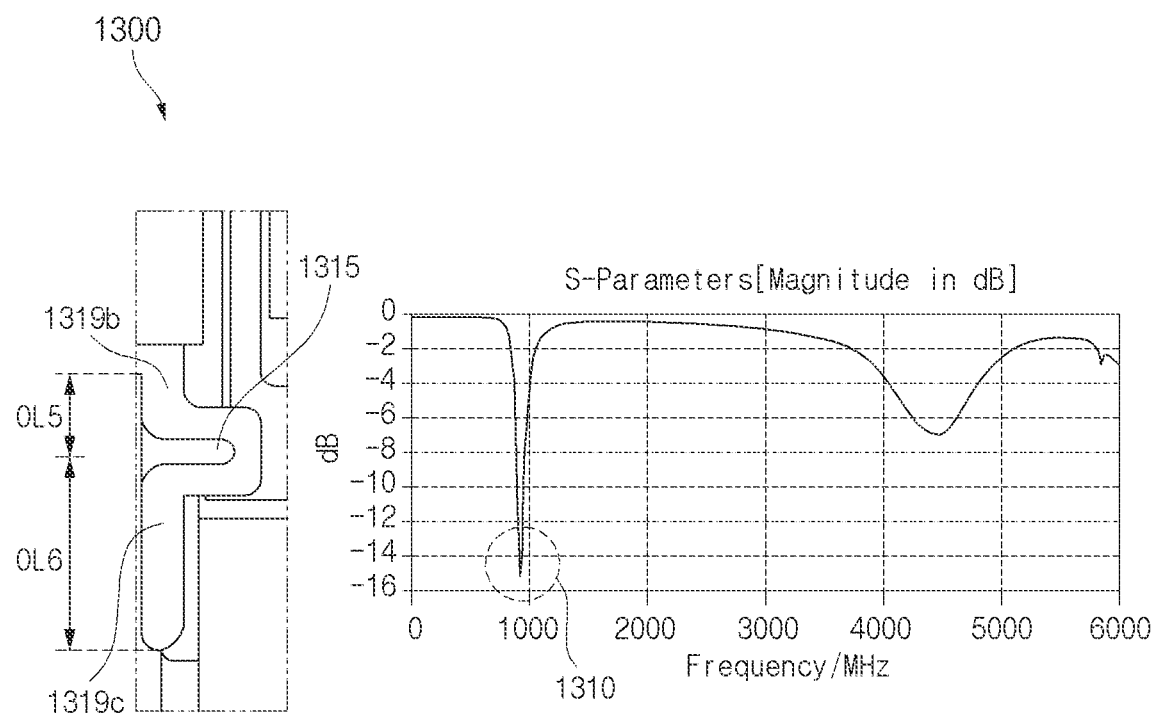

FIGS. 11 to 13 illustrate radiation performances 1110, 1120, and 1130 of an electronic device due to an internal structure of an opening according to various embodiments of the disclosure.

Referring to FIGS. 11 to 13, according to an embodiment, an electronic device (e.g., the electronic device 101 of FIG. 1) may form an antenna by using at least one opening (e.g., the second opening 719b or 919b of FIG. 7 or FIG. 9) and/or the third opening 719c or 919c formed in an interior of the housing. For example, a length OL1, OL3, or OL5 of the second opening (e.g., the second opening 919b of FIG. 9) may be a length of the second opening in the y axis direction. A length OL2, OL4, or OL6 of the third opening (e.g., the third opening 919c of FIG. 9) may be a length of the third opening in the y axis direction.

A change of an operation frequency of an antenna according to an opening (e.g., the second opening 719b or 919b of FIG. 7 or FIG. 9 and/or the third opening 719c or 919c) formed according to the conductive members of substantially the same length and locations of the protrusions 1115, 1215, and 1315 (e.g., the protrusion 615 of FIG. 6) formed in the conductive members may be identified from FIGS. 11 to 13. For example, the wireless communication circuit may indirectly supply electric power to the protrusions 1115, 1215, and 1315. The conductive member may include a portion of the first conductive member (e.g., the first conductive member 617a of FIG. 6) or at least a portion of the second conductive member (e.g., the second conductive member 617b of FIG. 6).

Referring to reference numeral 1100 of FIG. 11, according to an embodiment, the length OL1 of a second opening 1119b may be referenced as about 17 mm, and the length OL2 of a third opening 1119c may be referenced as about 5 mm. Then, a resonant frequency of a radiator referenced as the second opening 1119b and the third opening 1119c may be a resonant frequency at an about 1.5 GHz band 1110 and an about 2.8 GHz band 1120.

Referring to reference numeral 1200 of FIG. 12, according to an embodiment, the length OL3 of a second opening 1219b may be referenced as about 10 mm, and the length OL4 of a third opening 1219c may be referenced as about 12 mm. Then, a resonant frequency of a radiator referenced as the second opening 1219b and the third opening 1219c may be a resonant frequency at an about 1.2 GHz band 1210 and an about 3.8 GHz band 1220.

Referring to reference numeral 1300 of FIG. 13, according to an embodiment, the length OL5 of a second opening 1319b may be referenced as about 5 mm, and the length OL6 of a third opening 1319c may be referenced as about 17 mm. Then, a resonant frequency of a radiator referenced as the second opening 1319b and the third opening 1319c may be a resonant frequency of a band 1310 of less than 1 GHz.

According to an embodiment, a band of a resonant frequency, at which an antenna is operated, may be changed according to a length of an opening used as the antenna.

FIG. 14 is a block diagram 1400 of the electronic device 101 for supporting a legacy network communication and a 5G network communication according to an embodiment of the disclosure.

Referring to FIG. 14, the electronic device 101 may include a first communication processor 1412, a second communication processor 1414, a first radio frequency integrated circuit (RFIC) 1422, a second RFIC 1424, the third RFIC 1426, a fourth RFIC 1428, a first radio frequency front end (RFFE) 1432, a second RFFE 1434, a first antenna module 1442, a second antenna module 1444, and an antenna 1448. The electronic device 101 may further include the processor 120 and the memory 130. The second network 199 may include a first cellular network 1492 and a second cellular network 1494. According to another embodiment, the electronic device 101 may further include at least one of the components illustrated in FIG. 1, and the second network 199 may further include at least one another network. According to an embodiment, the first communication processor 1412, the second communication processor 1414, the first RFIC 1422, the second RFIC 1424, the fourth RFIC 1428, the first RFFE 1432, and the second RFFE 1434 may constitute at least a portion of the wireless communication module 192. According to another embodiment, the fourth RFIC 1428 may be omitted or may be included at a part of the third RFIC 1426.

The first communication processor 1412 may establish a communication channel of a band that is to be used for wireless communication with the first cellular network 1492, and may support legacy network communication through the established communication channel. According to various embodiments, the first cellular network 1492 may be a legacy network including 2-generation (2G), 3-generation (3G), 4-generation (4G), or long-term evolution (LTE). The second communication processor 1414 may establish a communication channel corresponding to a designated one (e.g., about 6 GHz to about 60 GHz) of bands that are to be used for wireless communication with the second cellular network 1494, and may support 5G network communication through the established communication channel. According to various embodiments, the second cellular network 1494 may be a 5G network defined by a 3GPP. In addition, according to an embodiment, the first communication processor 1412 or the second communication processor 1414 may establish a communication channel corresponding to another designated one (e.g., about 6 GHz or less) of bands that are to be used for wireless communication with the second cellular network 1494, and may support 5G network communication through the established communication channel. According to an embodiment, the first communication processor 1412 and the second communication processor 1414 may be implemented in a single chip or a single package. According to various embodiments, the first communication processor 1412 or the second communication processor 1414 may be disposed in a single chip or a single package together with the processor 120, the auxiliary processor 123 of FIG. 1, or the communication module 190.

The first RFIC 1422 may convert a baseband signal generated by the first communication processor 1412 into a radio frequency signal of about 700 MHz to about 3 GHz used for the first cellular network 1492 (e.g., the legacy network) during transmission of signals. An RF signal may be acquired from the first cellular network 1492 (e.g., the legacy network) through an antenna (e.g., the first antenna module 1442) and preprocess the acquired RF signal through an RFFE (e.g., the first RFFE 1432) during reception of signals. The first RFIC 1422 may convert the preprocessed RF signal to a baseband signal such that the preprocessed RF signal is processed by the first communication processor 1412.

The second RFIC 1424 may convert a baseband signal generated by the first communication processor 1412 or the second communication processor 1414 to an RF signal (hereinafter, a 5G sub6 RF signal) of a Sub6 band (e.g., about 6 GHz or less) used for the second cellular network 1494 (e.g., the 5G network) during transmission of signals. A 5G Sub6 RF signal may be acquired from the second cellular network 1494 (e.g., the 5G network) through an antenna (e.g., the second antenna module 1444) and may preprocess the acquired RF signal through an RFFE (e.g., the second RFFE 1434) during reception of signals. The second RFIC 1424 may convert the processed 5G Sub6 RF signal to a baseband signal such that the 5G Sub6 RF signal is processed by a corresponding one of the first communication processor 1412 or the second communication processor 1414.

The third RFIC 1426 may convert a baseband signal generated by the second communication processor 1414 into an RF signal (hereinafter, a 5G Above6 RF signal) of a 5G Above6 band (e.g., about 6 GHz to about 60 GHz) that is to be used for the second cellular network 1494 (e.g., the 5G network). A 5G Above6RF signal may be acquired from the second cellular network 1494 (e.g., the 5G network) through an antenna (e.g., the antenna 1448) and may be preprocessed through a third RFFE 1436 during reception of signals. For example, the third RFFE 1436 may perform pre-processing of a signal by using a phase converter 1438. The third RFIC 1426 may convert the preprocessed 5G Above6 RF signal to a baseband signal such that the preprocessed 5G Above6 RF signal is processed by the second communication processor 1414. According to an embodiment, the third RFFE 1436 may be included at a part of the third RFIC 1426.

According to an embodiment, the electronic device 101 may include the fourth RFIC 1428 separately from the third RFIC 1426 or as at least a part of the third RFIC 1426. In this case, the fourth RFIC 1428 may convert the baseband signal generated by the second communication processor 1414 into an RF signal (hereinafter, an intermediate frequency (IF) signal) of an intermediate frequency band (e.g., about 9 GHz to about 11 GHz), and then may deliver the IF signal to the third RFIC 1426. The third RFIC 1426 may covert the IF signal to a 5G Above6 RF signal. A 5G Above6 RF signal may be received from the second cellular network 1494 (e.g., the 5G network) through an antenna (e.g., the antenna 1448) and may be converted to the IF signal by the third RFIC 1426. The fourth RFIC 1428 may convert the RF signal to a baseband signal such that the RF signal is processed by the second communication processor 1414.

According to an embodiment, the first RFIC 1422 and the second RFIC 1424 may be implemented as at least a portion of a single chip or a single package. According to an embodiment, the first RFFE 1432 and the second RFFE 1434 may be implemented as at least a portion of a single chip or a single package. According to an embodiment, at least one of the first antenna module 1442 or the second antenna module 1444 may be omitted or coupled to another antenna module to process RF signals of a plurality of corresponding bands.

According to an embodiment, the third RFIC 1426 and the antenna 1448 may be disposed in the same substrate to constitute the third antenna module 1446. The third antenna module 1446 of FIG. 14 may be an antenna module corresponding to the antenna module 697 of FIG. 6, the antenna module 897 of FIG. 8, and the antenna module 1097 of FIG. 10, which have been described above. For example, the wireless communication module 192 or the processor 120 may be disposed in a first substrate (e.g., a main PCB). The third RFIC 1426 may be disposed in a partial area (e.g., a lower surface) of a second substrate (e.g., a sub-PCB) that is separate from the first substrate and the antenna 1448 may be disposed in another partial area (e.g., an upper surface) to constitute the third antenna module 1446. According to an embodiment, the antenna 1448, for example, may include an antenna array that may be used for beam forming. The length of a transmission line between the third RFIC 1426 and the antenna 1448 can be reduced by arranging the third RFIC 1426 and the antenna 1448 in the same substrate. For example, this can reduce loss of a signal of a high-frequency band (e.g., about 6 GHz to about 60 GHz) used for the 5G network communication due to the transmission line. Accordingly, the electronic device 101 can improve the quality or speed of the communication with the second cellular network 1494 (e.g., the 5G network).

The second cellular network 1494 (e.g., the 5G network) may be operated independently from or in conjunction with the first cellular network 1492 (e.g., the legacy network). For example, only an access network (e.g., a 5G radio access network (RAN) or a next generation (NG) RAN) may be present in the 5G network, and a core network (e.g., a next generation core (NGC)) may not be present. The electronic device 101 may access an access network of the 5G network, and then, may access an external network (e.g., the internet) under the control of a core network (e.g., an evolved packed core (EPC)) of the legacy network. Protocol information (e.g., LTE protocol information) for communication with the legacy network or protocol information (e.g., a new radio (NR) protocol information) for communication with the 5G network may be stored in a memory 130, and be accessed by another component (e.g., the processor 120, the first communication processor 1412, or the second communication processor 1414).

According to an embodiment, an electronic device may include a housing including a first plate facing a first direction, a second plate facing a second direction that is opposite to the first direction, and a side member surrounding a space between the first plate and the second plate and connecting one side of the first plate and one side of the second plate, a support member disposed in the space between the first plate and the second plate, a display disposed on a first surface of the support member and exposed through at least a portion of the first plate, an antenna module disposed on a second surface facing a direction that is opposite to the first surface of the support member and including one or more patch antennas, a printed circuit board (PCB) disposed on the second surface of the support member, a wireless communication circuit disposed on the PCB, a first conductive member included in the side surface member, and extending from a first end to a second end toward a third direction, a first connector protruding from one point between the first end and the second end of the first conductive member toward an interior of the housing, and physically connected to the support member, a second connector extending from the second end of the first conductive member toward an interior of the housing, and physically connected to the support member, and a protrusion extending from the first end of the first conductive member toward an interior of the housing, and electrically connected to the first conductive member. For example, the antenna module may be disposed at locations corresponding to a first opening defined by the first conductive member, the support member, the first connector, and the second connector, and a second opening defined by the first conductive member, the support member, the first connector, and the protrusion, and the wireless communication circuit may be electrically connected to the protrusion and the antenna module.

According to an embodiment, the electronic device may further include a second conductive member, and a third conductive member. For example, the second conductive member may be spaced apart from the first conductive member by a first division part formed in an area that is adjacent to the first end of the first conductive member, the third conductive member may be spaced apart from the first conductive member by a second division part formed in an area that is adjacent to the second end of the first conductive member, and the first conductive member, the second conductive member, and the third conductive member may correspond to a portion of the housing that defines an external appearance of the electronic device.

According to an embodiment, when viewed from the second surface, the second opening, a third opening defined by the support member and the protrusion along an outskirt of the protrusion, and the first division part may be one opening that is connected.

According to an embodiment, when viewed from the second surface, a distance from the first division part to one end of the second opening may correspond to 22 mm to 23 mm, and a distance from the one point of the conductive member to one end of the protrusion may correspond to 8 mm to 9 mm.

According to an embodiment, the at least one patch antenna included in the antenna module may be disposed to face a direction that is opposite to a direction that faces an interior of the housing.

According to an embodiment, the wireless communication circuit may be configured to radiate a frequency signal of a specific band in a direction, which the first surface faces, through the first opening and the second opening by using the antenna module.

According to an embodiment, the electronic device may further include at least one conductive elastic body physically coupled to the PCB and the protrusion. For example, the wireless communication circuit may be electrically connected to the protrusion through the at least one conductive elastic body to supply electric power.

According to an embodiment, the at least one conductive elastic body may include at least one of a C-clip or a pogo pin. For example, the antenna module may transmit and receive a millimeter wave (mmWave) signal.

According to an embodiment, the electronic device may further include a nonconductive material filled in at least one area of the first opening or the second opening.

According to an embodiment, one end of the first connector, which is connected to the support member, when viewed from the second surface, may correspond to one point between two adjacent ones of the one or more patch antennas.

According to an embodiment, an electronic device may include a housing including a first plate facing a first direction, a second plate facing a second direction that is opposite to the first direction, and a side member surrounding a space between the first plate and the second plate and connecting one side of the first plate and one side of the second plate, a support member disposed in the space between the first plate and the second plate, a display disposed on a first surface of the support member and exposed through at least a portion of the first plate, an antenna module disposed on a second surface facing a direction that is opposite to the first surface of the support member and including one or more patch antennas, a PCB disposed on the second surface of the support member, a wireless communication circuit disposed on the PCB, a first conductive member included in the side member, and extending from a first end to a second end toward a third direction, a second conductive member included in the side member, and physically spaced apart from the first conductive member by a first division part, a first connector protruding from one point between the first end and the second end of the first conductive member toward an interior of the housing, and physically connected to the support member, a second connector protruding from the second end of the first conductive member toward an interior of the housing, and physically connected to the support member, and a protrusion protruding from one point spaced apart from a first end of the second conductive member, which is adjacent to the first division part, by a distance in a fourth direction that is a direction that is opposite to the third direction, toward an interior of the housing, and electrically connected to the second conductive member. For example, the antenna module may be disposed at locations corresponding to a first opening defined by the first conductive member, the support member, the first connector, and the second connector, and a second opening defined by the first conductive member, the second conductive member, the first connector, the support member, and the protrusion, and the wireless communication circuit may be electrically connected to the protrusion and the antenna module.

According to an embodiment, the electronic device may further include a third conductive member. For example, the third conductive member may be physically spaced apart from the first conductive member by a second division part formed in an area that is adjacent to the second end of the first conductive member, and the first conductive member, the second conductive member, and the third conductive member may correspond to a portion of the housing that defines an external appearance of the electronic device.

According to an embodiment, when viewed from the second surface, the second opening, the first division part, and a third opening defined by the support member, the second conductive member, and the protrusion along an outskirt of the protrusion may be one opening that is connected.

According to an embodiment, when viewed from the second surface, a distance from one end of the first opening, which is adjacent to the first connector to one end of the third opening may correspond to 22 mm to 23 mm, and a distance from the one point of the second conductive member to one end of the protrusion may correspond to 8 mm to 9 mm.

According to an embodiment, the at least one patch antenna included in the antenna module may be disposed to face a direction that is opposite to a direction that faces an interior of the housing.

According to an embodiment, the electronic device may be configured to radiate a frequency signal of a specific band in a direction, which the first surface faces, through the first opening and the second opening.

According to an embodiment, the electronic device may further include at least one conductive elastic body physically coupled to the PCB and the protrusion. For example, the wireless communication circuit may be configured to supply electric power to the protrusion electrically connected thereto through the at least one conductive elastic body.

According to an embodiment, the at least one conductive elastic body may include at least one of a C-clip or a pogo pin. For example, the antenna module may transmit and receive a millimeter wave (mmWave) signal.

According to an embodiment, the electronic device may further include a nonconductive material filled in at least one area of the first opening or the second opening.

According to an embodiment, one end of the first connector, which is connected to the support member, when viewed from the second surface, may correspond to one point between two adjacent ones of the one or more patch antennas.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
a housing comprising a first surface facing a first direction, a second surface facing a second direction opposite to the first direction, and a side member surrounding a space between the first surface and the second surface;
a support member disposed in the space;
a display viewable through at least a portion of the first surface;
a printed circuit board (PCB) disposed in the housing; and
wireless communication circuitry disposed on the PCB,
wherein the side member comprises:
a first conductive member extending from a first end to a second end,
a second conductive member adjacent to the first end and separated from the first conductive member, and
a third conductive member adjacent to the second end and separated from the first conductive member,
wherein the first conductive member comprises:
a first connector protruding from one point between the first end and the second end of the first conductive member toward an interior of the housing, and physically connected to the support member,
a second connector extending from the second end of the first conductive member toward an interior of the housing, and physically connected to the support member, and
a protrusion extending from the first end of the first conductive member toward an interior of the housing, and electrically connected to the wireless communication circuitry,
wherein a first cavity is formed between the first conductive member and the support member, and
wherein a second cavity is formed between the first conductive member, the support member, and the second conductive member.

2. The electronic device of claim 1,
wherein the second conductive member is spaced apart from the first conductive member by a first division part formed in an area that is adjacent to the first end of the first conductive member, and
wherein the third conductive member is spaced apart from the first conductive member by a second division part formed in an area that is adjacent to the second end of the first conductive member.

3. The electronic device of claim 2, wherein the second cavity comprises the second division part.

4. The electronic device of claim 2,
wherein the first cavity is formed by an area between the first connector and the second connector, and
wherein the second cavity is formed by an area extended from the first connector to the first division part.

5. The electronic device of claim 1, further comprising:
an antenna module,
wherein the antenna module comprises at least one antenna array and disposed at a location corresponding to at least one of the first cavity or the second cavity.

6. The electronic device of claim 1, wherein the wireless communication circuitry is configured to radiate a frequency signal of a specific band at least through the first cavity and the second cavity by using an antenna module.

7. The electronic device of claim 1, further comprising:
at least one conductive connector physically coupled to the PCB and the protrusion,
wherein the wireless communication circuitry is electrically connected to the protrusion through the at least one conductive connector to supply electric power.

8. The electronic device of claim 7, wherein the at least one conductive connector comprises at least one of a C-clip or a pogo pin.

9. The electronic device of claim 1, further comprising:
a nonconductive material filled in at least one area of the first cavity or the second cavity.

10. The electronic device of claim 1, wherein the wireless communication circuitry is configured to radiate a second signal of a specific band using the first conductive member by feeding the first conductive member through the protrusion.

11. An electronic device comprising:
a housing comprising a first plate facing a first direction, a second plate facing a second direction that is opposite to the first direction, and a side member surrounding a space between the first plate and the second plate;
a support member disposed in the space;
a display viewable through at least a portion of the first plate;
a printed circuit board (PCB) in the housing; and
wireless communication circuitry disposed on the PCB,
wherein the side member comprises:
a first conductive member extending from a first end to a second end,
a second conductive member adjacent to the first end and physically spaced apart from the first conductive member, and
a third conductive member adjacent to the second end and physically spaced apart from the first conductive member,
wherein the first conductive member comprises:
a first connector protruding from one point between the first end and the second end of the first conductive member toward an interior of the housing, and physically connected to the support member, and
a second connector protruding from the second end of the first conductive member toward an interior of the housing, and physically connected to the support member,
wherein the second conductive member comprises:
a protrusion protruding from one point spaced apart from a third end, which is adjacent to the first end, toward an interior of the housing, and electrically connected to the wireless communication circuitry,
wherein a first cavity is formed between the first conductive member and the support member, and
wherein a second cavity is formed between the first conductive member, the support member, and the second conductive member.

12. The electronic device of claim 11, further comprising:
wherein the second conductive member is physically spaced apart from the first conductive member by a first division part, and
wherein the third conductive member is physically spaced apart from the first conductive member by a second division part formed in an area that is adjacent to the second end of the first conductive member.

13. The electronic device of claim 12, wherein the second cavity comprises the second division part.

14. The electronic device of claim 12,
wherein the first cavity is formed by an area between the first connector and the second connector, and
wherein the second cavity is formed by an area extended from the first connector to the protrusion.

15. The electronic device of claim 11, further comprising:
an antenna module,
wherein the antenna module comprises at least one antenna array and disposed at a location corresponding to at least one of the first cavity or the second cavity.

16. The electronic device of claim 11, wherein the wireless communication circuitry is configured to radiate a frequency signal of a specific band through at least one of the first cavity or the second cavity.

17. The electronic device of claim 11, further comprising:
at least one conductive connector physically coupled to the PCB and the protrusion,
wherein the wireless communication circuitry is configured to supply electric power to the protrusion electrically connected thereto through the at least one conductive connector.

18. The electronic device of claim 17, wherein the at least one conductive connector comprises at least one of a C-clip or a pogo pin.

19. The electronic device of claim 11, further comprising:
a nonconductive material filled in at least one area of the first cavity or the second cavity.

20. The electronic device of claim 11, wherein one end of the first connector, which is connected to the support member, when viewed from the second plate, corresponds to one point between two adjacent ones of one or more patch antennas.

* * * * *